United States Patent [19]

Kawamoto et al.

[11] Patent Number: 5,593,310
[45] Date of Patent: Jan. 14, 1997

[54] CABLE TYPE ELECTRIC CONNECTOR

[75] Inventors: Akio Kawamoto; Kazuhiro Kaneko, both of Fuji, Japan

[73] Assignee: Nihon Plast Co., Ltd., Fuji, Japan

[21] Appl. No.: 364,043

[22] Filed: Dec. 27, 1994

[30] Foreign Application Priority Data

| Dec. 27, 1993 | [JP] | Japan | ............... | 5-333072 |
| Mar. 24, 1994 | [JP] | Japan | ............... | 6-053705 |
| Mar. 28, 1994 | [JP] | Japan | ............... | 6-057685 |

[51] Int. Cl.⁶ .................................................. H01R 35/04
[52] U.S. Cl. ........................................ 439/164; 439/15
[58] Field of Search ................................... 439/15, 164

[56] References Cited

U.S. PATENT DOCUMENTS

| 4,872,842 | 10/1989 | Ishima et al. | ............... | 439/15 |
| 4,919,620 | 4/1990 | Yamaguchi et al. | ............... | 439/15 |
| 5,061,195 | 10/1991 | Bolen | ............... | 439/164 |
| 5,171,157 | 12/1992 | Bolen | ............... | 439/164 |
| 5,205,754 | 4/1993 | Kuramoto | ............... | 439/164 |
| 5,219,460 | 6/1993 | Kato et al. | ............... | 439/164 |
| 5,248,260 | 9/1993 | Ida et al. | ............... | 439/15 |
| 5,277,604 | 1/1994 | Ida et al. | ............... | 439/164 |

FOREIGN PATENT DOCUMENTS

| 0479567 | 4/1992 | European Pat. Off. . |
| 3537783 | 4/1987 | Germany . |
| 4211264 | 10/1992 | Germany . |
| 3-39911 | 8/1991 | Japan . |
| 4-112140 | 9/1992 | Japan . |
| 4-41590 | 9/1992 | Japan . |

*Primary Examiner*—Gary F. Paumen
*Attorney, Agent, or Firm*—Foley & Lardner

[57] ABSTRACT

As a part of a cable type electric connector, an annular housing structure is used which has a first cable leading portion. An annular guide body is rotatably and coaxially received in the annular housing structure. The annular guide body has a cable passing slot. An annular rotor is coaxially disposed on the annular housing structure. The annular rotor has a second cable leading portion. A flat cable is passed through the cable passing slot of the annular guide body so that the flat cable is divided into an inner flat cable part movably received in a circular space surrounded by the annular guide body and an outer flat cable part movably received in an annular space formed around the annular guide body. The inner flat cable part has an inner end exposed to the outside through the second cable leading portion and the outer flat cable part has an outer end exposed to the outside through the first cable leading portion. A lock mechanism is employed for locking at least one the annular rotor and the annular guide body relative to the annular housing structure.

7 Claims, 15 Drawing Sheets

5,593,310

CABLE TYPE ELECTRIC CONNECTOR

BACKGROUND OF THE INVENTION

1. Field of the Invention

The present invention relates in general to electric connectors, and more particularly, to electric connectors of a type which connects two electrical parts which are rotatable relative to each other. More specifically, the present invention is concerned with a cable type electric connector which generally comprises a first member connected to one fixed electrical part, and a second member connected to the other electrical part which rotates relative to the fixed electric part and a resilient and spiraled electric cable having both ends connected to the first and second members.

2. Description of the Prior Art

Japanese Utility Model First Provisional Publication 4-112140 and Japanese Utility Model Second Provisional Publications 3-39911 and 4-41590 show cable type electric connectors. These connectors are applied to a motor vehicle for establishing electric connection between an electrical part mounted on a steering wheel and another electrical part mounted on a fixed structure of the vehicle body. Each connector comprise generally a first member connected to the first electric part of the steering wheel, a second member connected to the other electric part of the fixed structure and a resilient electric cable having both ends connected to the first and second members.

However, due to their inherent constructions, these conventional connectors have failed to satisfy the need of the users. That is, some are costly, some are bulky, some are complicated, and some need a very skilled technique for assembling the same to the vehicle.

SUMMARY OF THE INVENTION

It is therefore an object of the present invention to provide a cable type electric connector which is free of the above-mentioned drawbacks.

According to a first aspect of the present invention, there is provided a cable type electric connector which comprises an annular housing structure having a first cable leading portion; an annular guide body rotatably and coaxially received in the annular housing structure, the annular guide body having a cable passing slot; an annular rotor coaxially disposed on the annular housing structure, the annular rotor having a second cable leading portion; a flat cable passed through the cable passing slot of the annular guide slot so that the flat cable is divided into an inner flat cable part movably received in a circular space surrounded by the annular guide body and an outer flat cable part movably received in an annular space formed around the annular guide body, the inner flat cable part having an inner end exposed to the outside through the second cable leading portion and the outer flat cable part having an outer end exposed to the outside through the first cable leading portion; and a lock mechanism for locking at least one the annular rotor and the annular guide body relative to the annular housing structure.

According to a second aspect of the present invention, there is provided a cable type electric connector which comprises an annular housing structure having an outer cylindrical wall and a first cable leading structure; a circular rotor coaxially disposed on the annular housing structure in a manner to make a relative rotation therebetween, the circular rotor having a circular center opening; an inner cylindrical wall integrally formed on the circular rotor and projected from a peripheral portion of the circular center opening toward the bottom of the annular housing structure, the inner cylindrical wall having a second cable leading structure; and a flat cable movably spiraled in an annular space defined between the outer cylindrical wall and the inner cylindrical wall, the flat cable having an inner end portion exposed to the outside through the second cable leading structure and an outer end portion exposed to the outside through the first cable leading structure.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to FIGS. 1 to 7, particularly FIGS. 1 to 4, of the drawings, there is shown a first embodiment of the present invention, which is a cable type electric connector generally designated by reference 10A.

As will be understood as the description proceeds, the connector of this embodiment is disposed between an automotive steering wheel and a fixed portion of a vehicle body for connecting a first electric part mounted on the steering wheel and a second electrical part mounted on the fixed portion. More specifically, the first electric part is an air-bag device, a horn switch, an auto-speed control switch, an air conditioner control switch and/or an audio device control switch. The second electric part is a wire harness connector to which a battery, a vehicle collision sensor, a horn device, an auto-speed controller, and/or an audio device is connected through wires.

Figure 1:
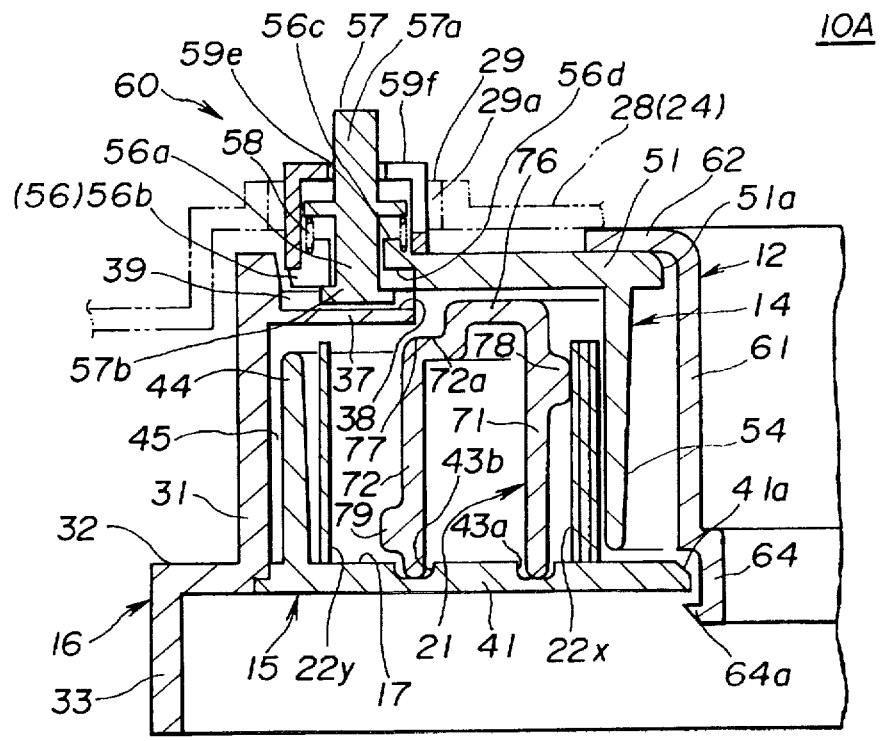
FIG. 1 is a sectional view of an upper-left half of a cable type electric connector which is a first embodiment of the present invention, the view showing a condition wherein a lock bar of a lock mechanism takes its lower operative position.
Figure 3:
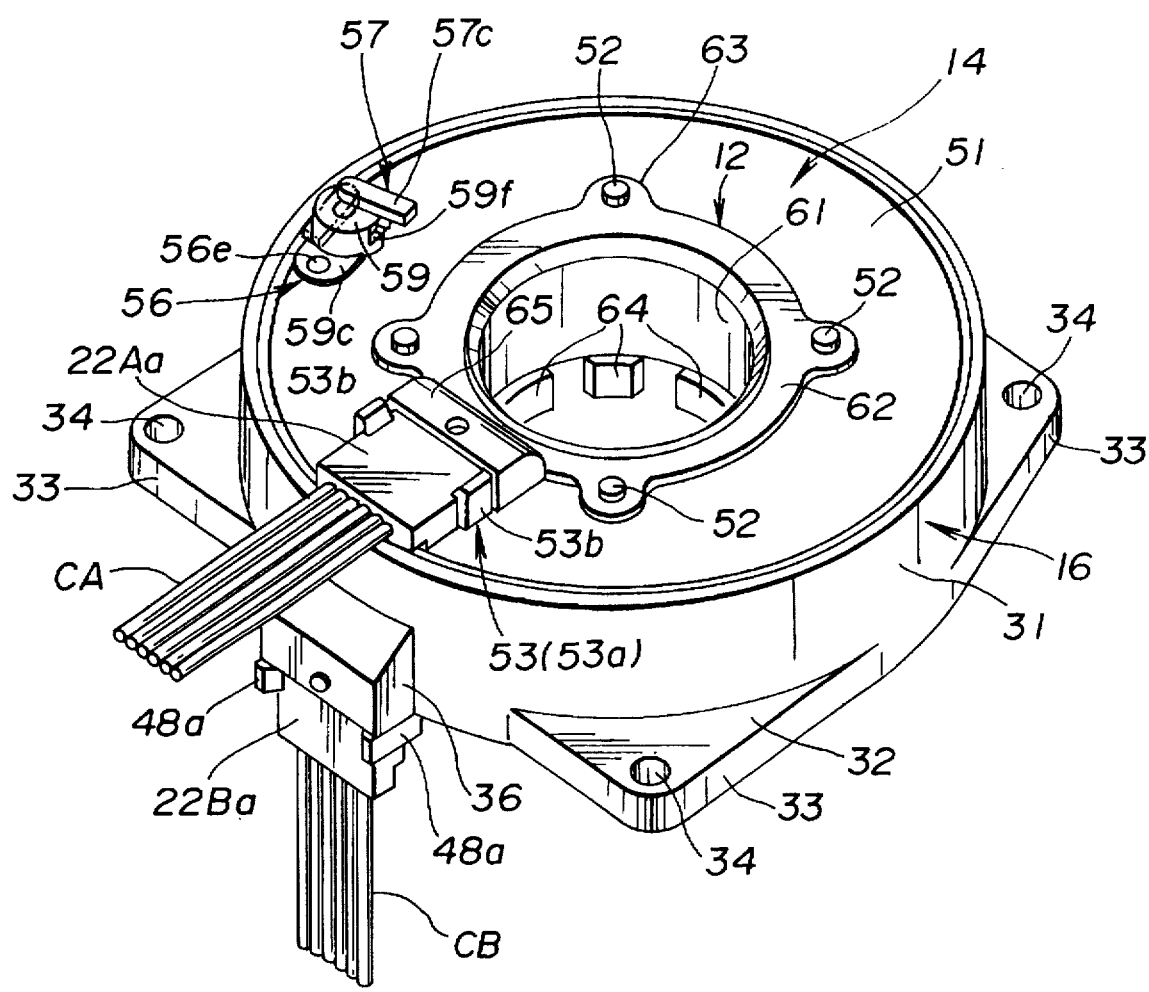
FIG. 3 is a perspective view of the connector of the first embodiment.
Figure 4:
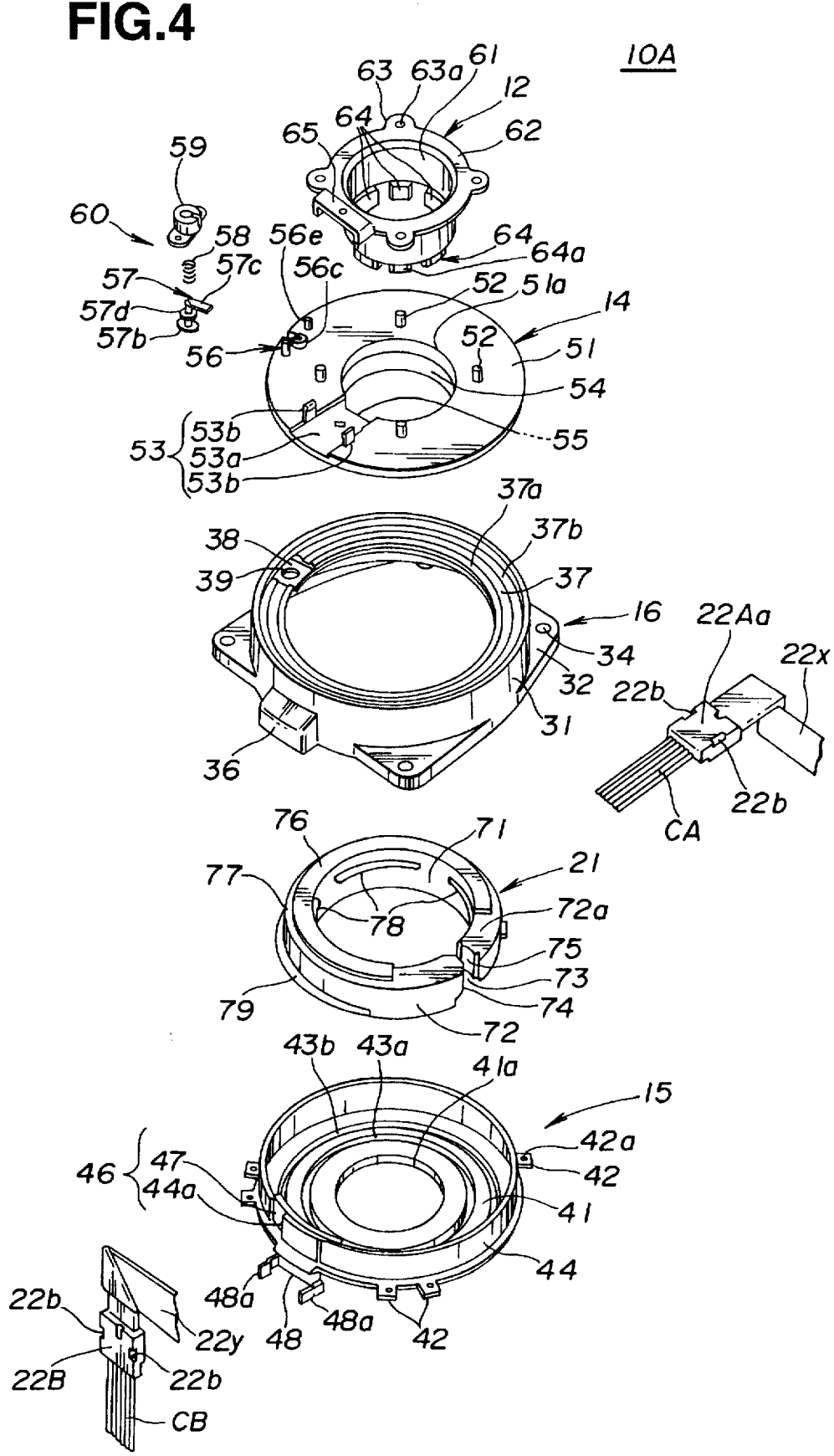
FIG. 4 is an exploded view of the connector of the first embodiment.

As is best understood seen from FIGS. 3 and 4, the connector 10A generally comprises an annular housing 16 which is to be secured to the fixed portion of the vehicle body, a stator 15 which is unmovably installed in the annular housing 16, a rotor 14 which is rotatably installed in the annular housing 16, an annular guide body 21 which is freely received on the stator 15 in the annular housing 16, a resilient flat cable 22 which is installed in the annular housing 16 and guided by the guide body 21, and a mounting collar 12 which is to be secured to a back side of a steering wheel 24 (see FIG. 1). The parts 16, 15, 14, 21 and 12 are each constructed of an engineering plastic such as polyacetal or the like.

As is seen in FIG. 1, the annular guide body 21 is received in an annular space 17 defined between a cylindrical outer wall 44 of the stator 15 and a cylindrical inner wall 54 of the rotor 14.

Furthermore, a middle part of the resilient flat cable 22 is neatly wound and received in the annular space 17 in such a manner as will be described in detail hereinafter.

Figure 5:
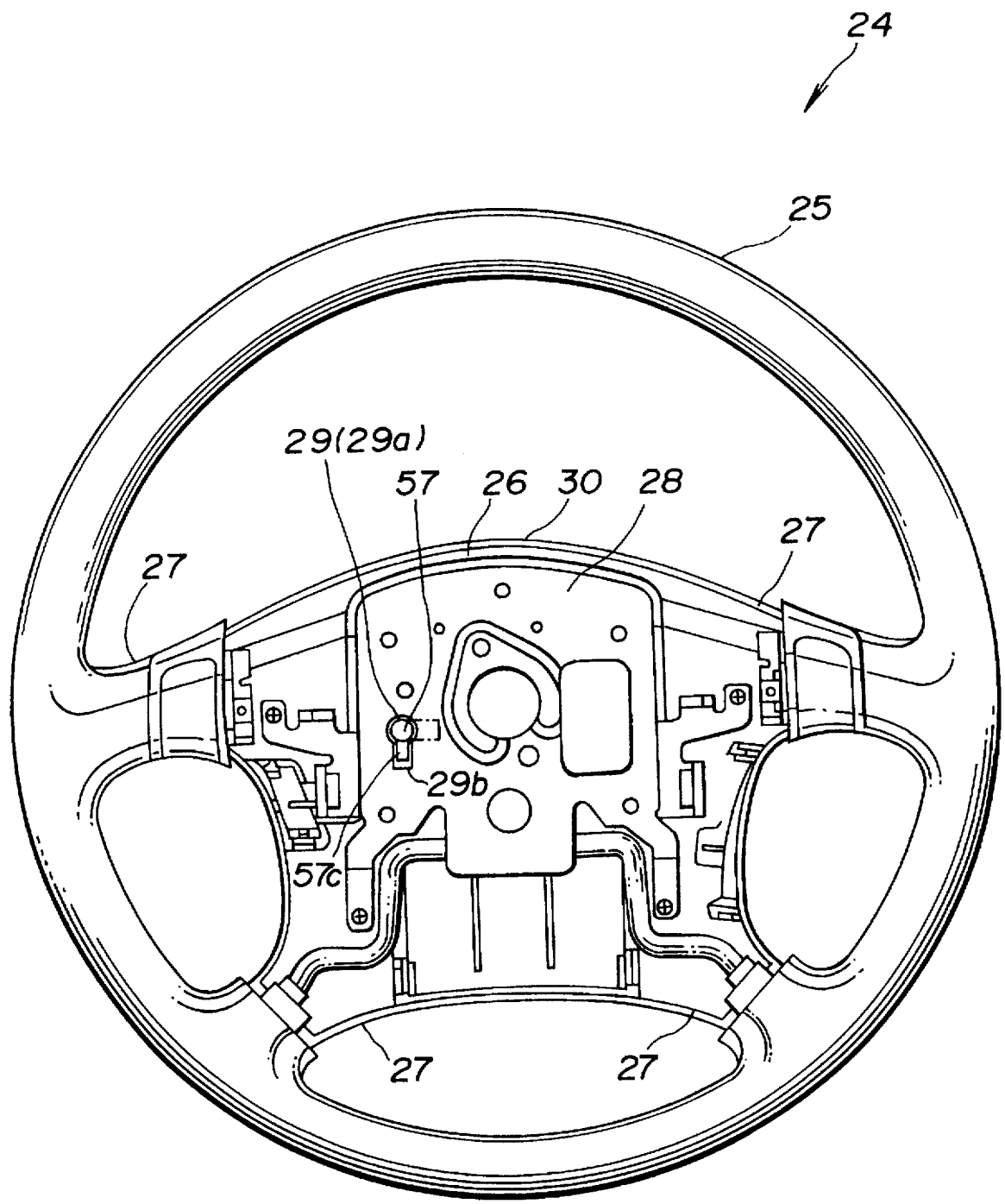
FIG. 5 is a plan view of a steering wheel to which the cable type electric connector of the first embodiment is to be applied.

Referring to FIG. 5, there is shown the steering wheel 24 to which the connector 10A is practically applied. The steering wheel 24 shown in the drawing generally comprises an annular rim 25, a boss portion 26 positioned inside the rim 25 and spokes 27 which connect the rim 25 with the boss portion 26. The boss portion 26 comprises a cylindrical center boss (not shown) and a boss plate 28 which are integrally connected. The center boss is secured to a head of a steering shaft (not shown), so that the steering wheel 24 and the steering shaft are rotated together like a unit.

For the reason which will become apparent hereinafter, the boss plate 28 is formed with an opening 29 which is shaped like a keyhole, comprising a circular portion 29a and a rectangular portion 29b. A back side of the boss portion 26 is covered with a plastic lower cover 30.

The steering shaft is connected to a known steering mechanism, so that, for steering the associated motor vehicle, the steering wheel can make about two or two and a half turns from its neutral position. That is, about four or five turns are available to the steering wheel between one locked position and another locked position.

As will be understood from FIG. 3, the resilient flat cable 22 comprises a plurality (in general, two to nine) of parallel wires embedded in an elongate flat electrically insulating cover. The cable 22 has at opposed ends respective plugs (not shown) which are to be connected to sockets 22Aa and 22Ba of lead cables CA and CB, as is seen from FIG. 3. The cable CA leads to the first electrical part on the steering wheel and the other cable CB leads to the wire harness connector on the steering column.

As is seen from FIG. 3, the annular housing 16 comprises a trapezoidal open base portion 32 which is secured to the fixed portion of the vehicle body, and a cylindrical outer wall 31 which stands on the base portion 32. The base portion 32 has four mounting lugs 33 which are to be secured to the steering column by means of four bolts (not shown) passing through bolt holes 34 respectively formed in the lugs 33. A back surface of the base portion 32 is formed with a stepped structure for connection with the stator 15. As is best shown in FIG. 3, the outer wall 31 of the annular housing 16 is formed at a lower part thereof with a projected portion 36. The projected portion 36 is formed with a through bore exposed to the lower side of the annular housing 16. As will be described hereinafter, the socket 22Ba is partially received in the through bore of the projected portion 36.

As is seen from FIG. 1, the outer wall 31 of the annular housing 16 is formed at its upper part with an annular wall 37 which extends radially inward. As is seen from FIG. 4, the annular wall 37 is formed at its upper surface with two concentric annular ridges 37a and 37b. As is seen from the same drawing, the upper surface of the annular wall 37 is formed with a flat rectangular part 38. The rectangular part 38 is formed with a circular recess 39.

As is seen from FIGS. 1 and 3, the stator 15 comprises a circular base plate 41 which is received in the recess of the base portion 32 of the annular housing 16. The circular base plate 41 is formed with a circular center opening 41a. As is seen from FIG. 4, the circular base plate 41 is formed with a plurality of connecting lugs 42 which are neatly engaged with the stepped structure of the back surface of the base portion 32 of the annular housing 16. Each connecting lug 42 is formed with an aperture 42a into which a pin (not shown) projected from the base portion 32 of the annular housing 16 is inserted. Upon assembly, projected portions of the pins are welded to assure connection between the annular housing 16 and the stator 15. As is seen from FIGS. 1 and 4, the circular base plate 41 is formed at its upper surface with two concentric annular grooves 43a and 43b.

Furthermore, as is seen from FIGS. 1 and 4, a cylindrical outer wall 44 stands on a peripheral edge portion of the circular base plate 41. When the stator 15 is mounted to the annular housing 16, a given annular clearance 45 is defined between the wall 44 of the stator 15 and the outer wall 31 of the annular housing 16, as shown in FIG. 1.

As is seen from FIG. 4, the outer wall 44 of the stator 15 has an open portion 46 through which the other end portion of the resilient flat cable 22 extends to the outside of the stator 15. The open portion 46 comprises a rectangular opening 44a formed in the outer wall 44, and an arcuate wall segment 47 standing on the circular base plate 41 of the stator 15 to cover opening 44a from the inside. The arcuate wall segment 47 has an extension which is pressed against an inner surface of the outer wall 44. The other end portion (or, outer end portion) of the resilient flat cable 22 is sandwiched between the extension of the wall segment and the inner surface of the outer wall 44 of the stator 15 and led into the outside of the outer wall 44 through the rectangular opening 44a. Thus, the flat cable 22 is forced to stand in the annular space 17 while making multi-turns in the space 17, the space 17 being defined by the outer wall 44 of the stator 15 and the inner wall 54 of the rotor 14, as has been described hereinabove.

The other end portion of the flat cable 22, which is led to the outside of the stator 15 through the rectangular opening 44a, is turned back at an edge of the opening 44a and then folded at right angles to extend downward toward a socket holding lug 48 which extends downward from a peripheral edge of the circular base plate 41. The socket holding lug 48 is formed with a pair of latching pawls 48a. As has been described hereinbefore, the outer end of the flat cable 22 has a plug fixed thereto and the plug is connected to a socket 22Ba (see FIG. 3). The socket 22Ba is held by the holding lug 48. For assured connection therebetween, the socket 22Ba is formed with a pair of notches 22b with which the latching pawls 48a are latchingly engaged. As has been described hereinafore, the socket 22Ba (and thus the holding lug 48) is partially received in the apertured projected portion 36 of the annular housing 16 and protected by the same.

As is seen from FIGS. 1 and 4, the rotor 14 comprises an annular base plate 51 and a coaxial cylindrical inner wall 54 which extends downward from the base plate 51. The annular base plate 51 is slidably put on the annular wall 37 of the annular housing 16 having the cylindrical inner wall 54 projected into the interior of the annular housing 16 through the center circular aperture of the annular wall 37. Due to the two concentric annular ridges 37a and 37b formed on the annular wall 37, the base plate 51 can smoothly slide or rotate on the annular wall 37. A center circular aperture of the annular base plate 51 is denoted by numeral 51a. The base plate 51 has, around the circular aperture thereof, four extending pins 52 which extend upward. The base plate 51 has at an upper surface thereof a socket holding portion 53 which comprises a recessed portion 53a and a pair of latching pawls 53b which face each other. As has been described hereinafore, upon assembly of the electric connector 10A, the annular space 17 for the flat cable 22 is defined between the cylindrical outer wall 44 of the stator 15 and the cylindrical inner wall 54 of the rotor 14.

The cylindrical inner wall 54 of the rotor 14 is formed, at a portion near the socket holding portion 53, with an axially and tangentially extending slit 55 which is defined between two outer and inner wall members which are pressed against each other. The inner end portion of the flat cable 22 is thrust in the slit 55 and led into the interior of the cylindrical inner wall 54.

The inner end portion of the flat cable 22, which is thus led into the cylindrical inner wall 54, is turned back at an edge of the slit 55 and then folded at right angles to extend upward toward the socket holding portion 53 of the rotor 14. As has been described hereinafore, the inner end of the flat cable 22 has a plug fixed thereto and the plug is connected to a socket 22Aa (see FIG. 3). The socket 22Aa is held by the socket holding portion 53. The socket 22Aa is formed with a pair of notches 22b with which the latching pawls 53b of the socket holding portion 53 are latchingly engaged.

Figure 6:
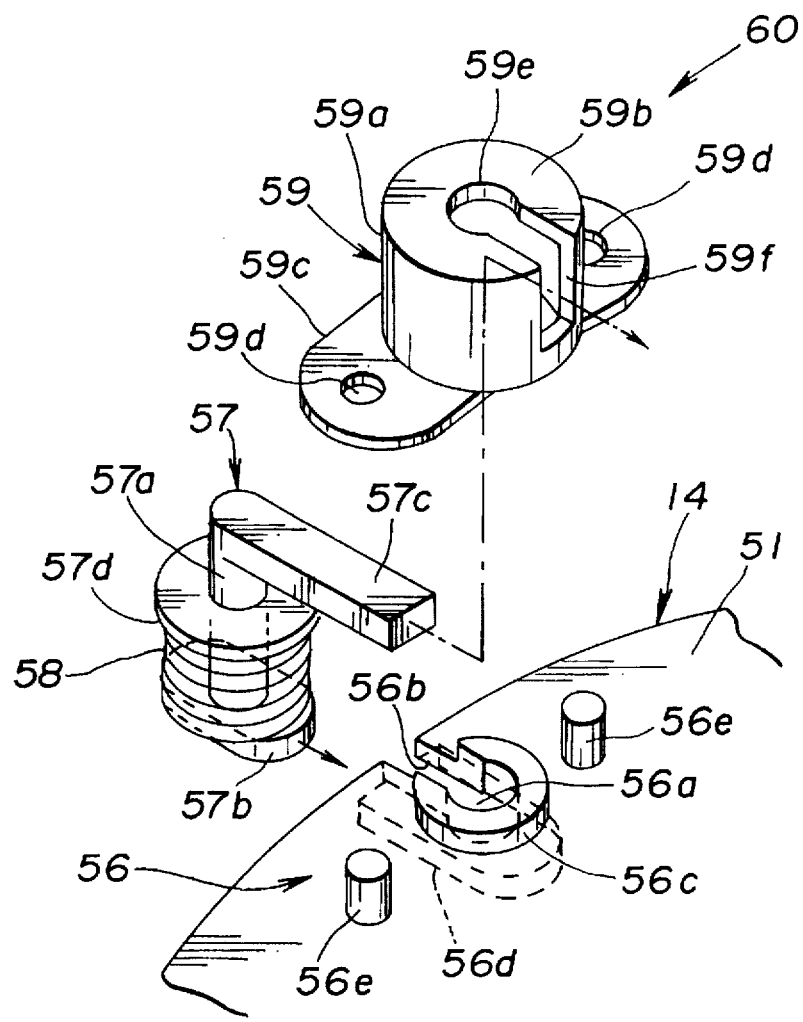
FIG. 6 is an enlarged exploded view of the lock mechanism employed in the connector of the first embodiment.
Figure 7:
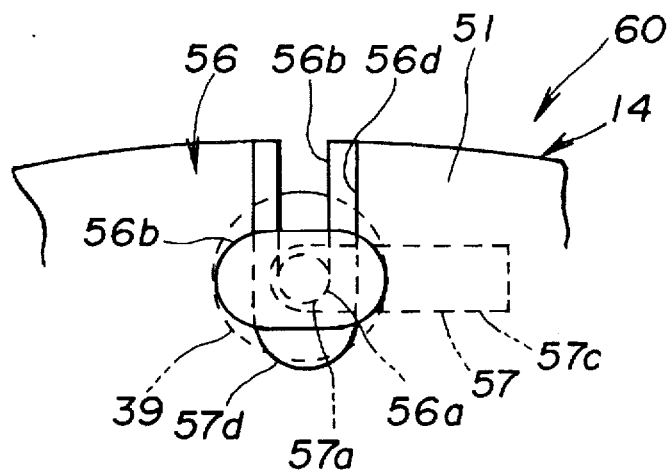
FIG. 7 is a bottom view of the lock mechanism in an assembled condition.

As is seen from FIGS. 6 and 7, the annular base plate 51 of the rotor 14 is formed at its outer peripheral portion with a lock holding structure 56 which has a radially extending slot formed in the base plate 51. The slot comprises a circular part 56a and an elongate part 56b which extends radially from the circular part 56a to the outside of the periphery of the base plate 51, as is seen from FIG. 7. A cylindrical projection 56c having a generally C-shaped cross section projects upward from the periphery of the circular part 56a.

As is understood from FIG. 6, a groove 56d is formed in a back surface of the base plate 51, which is merged with the slot (56a+56b). As will be described hereinafter, the groove 56d is so sized as to neatly receive an elliptical lock plate portion 57b of a lock unit 60. A pair of pins 56e are projected upward from the annular base plate 51 at both sides of the cylindrical projection 56c.

As is seen from FIGS. 6 and 7, to the lock holding structure 56, there is detachably connected the lock unit 60.

The lock unit 60 comprises generally a lock bar 57, a coil spring 58 and a cover structure 59. The lock bar 57 comprises a cylindrical shaft portion 57a, the above-mentioned lock plate portion 57b having a center part to which a lower end of the shaft portion 57a is integrally connected, a handle portion 57c extending from an upper end of the shaft portion 57a in a direction parallel with the major axis of the elliptical lock plate portion 57b, and a circular flange portion 57d extending from a middle part of the shaft portion 57a.

The shaft portion 57a is so shaped and sized as to be rotatable and axially slidable in the circular part 56a of the slot of the lock holding structure 56 of the annular base plate 51.

As is seen from FIG. 5, upon assembly of the electric connector 10A to the steering wheel 24, the handle portion 57c of the lock bar 57 is passed through the rectangular portion 29b of the opening 29 of the boss plate 28 and projected upward. Under this condition, the shaft portion 57a of the lock bar 57 is rotatably disposed in the circular portion 29a of the opening 29.

As will be understood from FIGS. 4 and 6, when the rotor 14 is turned to a given position relative to the annular housing 16, the lock plate portion 57b can be mated with the circular recess 39 of the annular wall 37 of the annular housing 16 to which the stator 15 is connected.

It is to be noted that the length of the longitudinal axis of the elliptical lock plate portion 57b is substantially equal to the diameter of the circular recess 39 of the annular wall 37, for the reason which will become apparent hereinafter.

Furthermore, when, by rotating the shaft portion 57a, the lock plate portion 57b becomes so oriented that the longitudinal axis thereof extends toward the mouth of the groove 56d of the lock holding structure 56, the lock plate portion 57b can be slid in the groove 56d.

As is understood from FIG. 6, the coil spring 58 is disposed about the shaft portion 57a and compressed between the circular flange 57d and the lock plate portion 57b. When the lock bar 57 is properly held by the lock holding structure 56, the coil spring 58 is compressed between the circular flange 57d and annular base plate 51 while receiving therein the cylindrical projection 56c. Thus, under this condition, the lock bar 57 is biased upward.

The cover structure 59 comprises generally a cylindrical portion 59a, a circular lid portion 59b covering an upper open end of the cylindrical portion 59a, and a pair of mounting lugs 59c extending in opposite directions from a lower part of the cylindrical portion 59a. The cover structure 59 is formed with a slot which comprises a circular opening 59e formed in the center of the lid portion 59b and an elongate slot 59f which extends from the circular opening 59e to a lower part of the cylindrical portion 59a. Each mounting lug 59c is formed with an opening 59d. The pins 56e of the annular base plate 51 of the rotor 14 are inserted into the openings 59d and projected parts of the pins 56e are welded. With this, the cover structure 59 is secured to the annular base plate 51 while receiving therein the lock bar 57 and the coil spring 58, except the handle portion 57c of the lock bar 57 and the upper part of the shaft portion 57a.

Referring back to FIG. 4, the mounting collar 12 generally comprises a cylindrical inner wall 61 and an annular flange portion 62 which is formed at an upper end of the inner wall 61. The cylindrical inner wall 61 is securely disposed about the steering shaft (not shown) and coaxially disposed in the center circular aperture 51a of the annular base plate 51 of the rotor 14. The annular flange portion 62 is formed with four connecting lugs 63 each having an opening 63a. The cylindrical inner wall 61 is formed at its lower end with a stator holding structure 64 which comprises a plurality of latch pawls 64a which can be resiliently flexed inwardly when pressed. Each latch pawl 64a is formed at its outer side with a recess (see FIG. 1) for the purpose which will be described hereinafter. The annular flange portion 62 of the mounting collar 12 is further formed with a cable holding portion 65 which is projected upward.

In assembly, the four pins 52 of the rotor 14 are inserted into the openings 63a of the connecting lugs 63 of the mounting collar 12, and projected head portions of the pins 92 are welded. With this, the mounting collar 12 is secured to the rotor 14 having the cylindrical inner wall 61 thereof coaxially received in the cylindrical inner wall 54 of the rotor 14 and having the cable holding portion 65 thereof mated with the socket 22Aa held by the socket holding portion 53 of the rotor 14.

Thus, the mounting collar 12 and the rotor 14 are rotated together with the steering shaft and thus together with the steering wheel 24.

As will be seen from FIG. 1, when the mounting collar 12 is properly assembled, the recesses of the latch pawls 64a of the stator holding structure 64 thereof slidably receive an inner periphery 41a of the circular base plate 41 of the stator 15. That is, in assembly, due to the resilient structure of the latch pawls 64a, the inner periphery of the 41a of the stator 15 becomes into engagement with the recesses of the latch pawls 64a in a snap action manner.

Thus, it is to be noted that the mounting collar 12 and the rotor 14 constitute a first unit which is rotatable relative to a second unit which comprises the stator 15 and the annular housing 16.

It is further to be noted that once the mounting collar 12 is properly set, the mounting collar 12, the rotor 14, the annular guide body 21, the stator 15 and the annular housing 16 are united together to constitute the electric connector 10A.

As is seen from FIGS. 1 and 4, the annular guide body 21 is rotatably and coaxially received between the cylindrical inner wall 54 of the rotor 14 and the cylindrical outer wall 44 of the stator 15. The annular guide body 21 comprises an inner cylindrical wall 71 facing the inner wall 54 of the rotor 14, an outer cylindrical wall 72 facing the outer wall 44 of the stator 15, and an annular upper portion 72a through which upper ends of the inner and outer walls 71 and 72 are integrally connected. The inner and outer cylindrical walls 71 and 72 have lower ends slidably engaged with the annular grooves 43a and 43b of the stator 15, as is best seen in FIG. 1. Thus, the annular guide body 21 can rotate around the cylindrical inner wall 54 of the rotor 14 while being guided by the annular grooves 43a and 43b.

As is seen from FIG. 4, the annular guide body 21 is formed with an axially extending slot 73 which is defined between opposed end walls 74 and 75 of the guide body 21. The end wall 74 has a convex surface and the other end wall 75 has a concave surface. Thus, the slot 73 has a curled shape. As will be described hereinafter, the flat cable 22 is slidably passed through the slot 73 of the annular guide body 21. The thickness of the slot 73 (viz., the distance between the opposed end walls 74 and 75) is about 1 mm to 10 mm, which depends on the thickness of the flat cable 22 used. Preferably, the thickness of the slot 73 is about 2 mm to 5 mm when the thickness of the flat cable 22 is about 0.1 mm to 0.2 mm.

The annular upper portion 72a of the body 21 is formed at its inner part with a coaxial ridge portion 76, so that a stepped annular portion 77 is defined around the ridge portion 76. Upon assembly, the stepped annular portion 77 is in slidable contact with an inner peripheral portion of the annular wall 37 of the annular housing 16.

As is best shown in FIG. 4, the inner cylindrical wall 71 of the annular guide block 21 is formed at its inner surface with a plurality of mutually spaced ridges 78 which extend in a circumferential direction. Each ridge 78 has a convex top in section and the top is smoothly finished.

As is seen from the same drawing, the outer cylindrical wall 72 of the annular guide block 21 is formed at its outer lower surface with a plurality of mutually spaced ridges 79 which extend in a circumferential direction. Each ridge 79 has a convex top in section and the top is smoothed. If desired, these ridges 79 may extend in axial direction or diagonally on the outer surface of the wall 72.

As is seen from FIG. 1, upon proper coupling between the annular guide block 21 and the stator 15, the ridges 78 of the inner cylindrical wall 71 of the block 21 project radially inward beyond the inner annular groove 43a, and the ridges 79 of the outer cylindrical wall 72 of the block 21 project radially outward beyond the outer annular groove 43b.

The resilient flat cable 22 received in the annular space 17 has a portion passed through the slot 73 of the annular guide body 21, so that the flat cable 22 is divided into two parts, which are an inner flat cable part 22x wound in one direction around the cylindrical inner wall 54 of the rotor 14 and an outer flat cable part 22y wound in the other direction around the outer cylindrical wall 72 of the annular guide body 21. More specifically, the inner part 22x is loosely wound in an annular space defined between the inner wall 54 of the rotor 14 and the inner cylindrical wall 71 of the annular guide block 21, while the outer part 22y is loosely wound in an annular space defined between the outer cylindrical wall 72 of the guide block 21 and the cylindrical outer wall 44 of the stator 15. When viewed from the top of the assembled connector 10A, the inner part 22x of the flat cable 22 is wound in a counterclockwise direction, while the outer part 22y is wound in a clockwise direction.

Preferably, the ridges 78 and 79 of the guide body 21 are so positioned as not to contact portions of the flat cable 22 just where the wires are embedded.

In the following, steps of assembling the cable type electric connector 10A of the first embodiment to a given position of a motor vehicle will be described with reference to the drawings.

Figure 2:
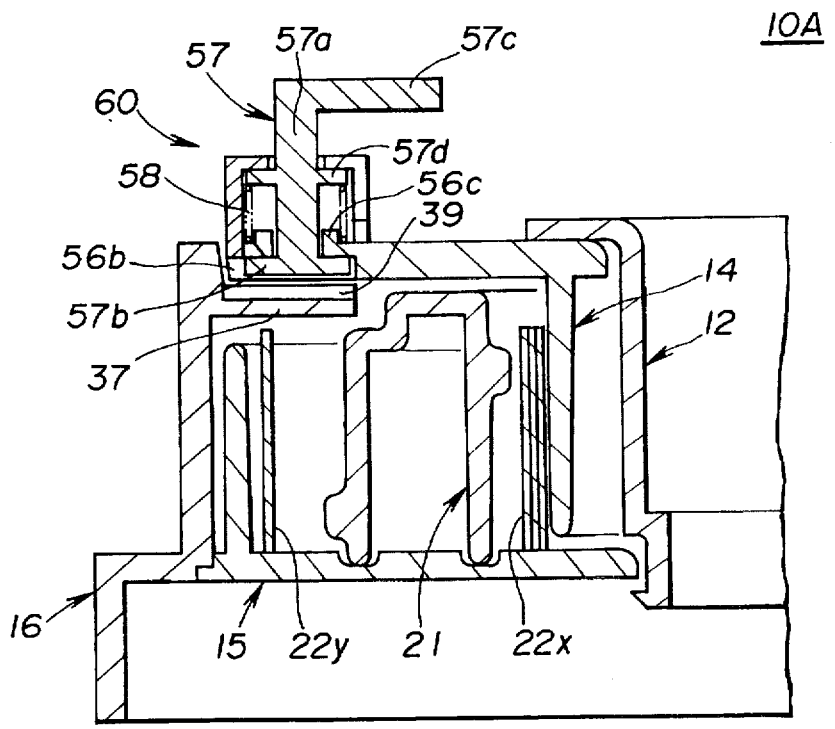
FIG. 2 is a view similar to FIG. 1, but showing that the lock bar takes its upper inoperative position.

For ease of understanding, the description will be commenced with respect to a condition wherein, as is seen from FIG. 2, the lock plate portion 57b is neatly received in groove 56d causing the lock bar 57 to keep its upper inoperative position due to the force of the coil spring 58. Thus, under this condition, the lock plate portion 57b is disengaged from the circular recess 39 of the annular wall 37 of the annular housing 16 and thus the rotor 14 can freely rotate on the annular wall 37. Then, the rotor 14 is turned to a given position wherein the lock plate portion 57b of the lock unit 60 on the rotor 14 is placed just above the circular recess 39 of the annular wall 37 of the annular housing 16. Then, the handle portion 57c of the lock bar 57 is pushed down against the coil spring 58 to a position where the lock plate portion 57b is disengaged from the groove 56d, and then, the handle portion 57c is turned at right angles causing the lock plate portion 57b to abut against the lower surface of the annular base plate 51 of the rotor 14.

Thus, under this condition, as is seen from FIGS. 1 and 7, the lock bar 57 takes its lower operative position having the lock plate portion 57*b* thereof lockingly put in the circular recess 39. That is, as is seen from FIG. 7, the longitudinal ends of the elliptical lock plate portion 57*b* are in abutment with diametrically opposed wall portions of the circular recess 39 of the annular wall 37 of the annular housing 16.

Thus, rotation of the rotor 14 on the annular wall 37 of the annular housing 16 is suppressed and thus, the electric connector 10A is locked.

The locked electric connector 10A is then connected to the given position of the motor vehicle. That is, the stator 15 is placed on and fixed to the steering column, while having the head portion of the steering shaft passed through the center bore of the connector 10A.

Then, as will be understood from FIG. 5, the boss of the steering wheel 24 is properly engaged with the head of the steering shaft. With this, the handle portion 57*c* of the lock bar 57 of the lock unit 60 is projected upward through the rectangular portion 29*b* of the opening 29 formed in the boss plate 28 of the steering wheel 24. Under this condition, the boss plate 28 of the steering wheel 24 and the rotor 14 of the connector 10A are connected through the lock unit 60.

Then, the handle portion 57*c* of the lock bar 57 is turned by right angles to be returned to the original position. With this, the lock plate portion 57*b* of the lock bar 57 is neatly received in groove 56*d* disengaging from the circular recess 39. Thus, the locked condition of the electric connector 10A becomes canceled. Thus, under this condition, the rotor 14 can freely rotate on the annular wall 37 of the annular housing 16.

Then, a cable CA (see FIG. 4) extending from the socket 22Aa on the rotor 14 is connected to the electric parts mounted on the steering wheel 24. For this connection, the steering wheel 24 has a known connector mounted thereon. Further, a cable CB extending from the other socket 22Ba held by the stator 15 is connected to the wire harness connecter secured to the fixed portion of the vehicle.

In the following, operation of the electric connector 10A will be described.

When the steering wheel 24 is turned clockwise as viewed from the top of FIG. 3, the flat cable 22 is pulled by the cylindrical inner wall 54 of the rotor 14 and wound around the same in a clockwise direction. During this rotation, the outer flat cable part 22*y* in the outer annular clearance between the cylindrical outer wall 44 of the stator 15 and the annular guide body 21 is drawn, through the slot 73 of the annular guide body 21, into the inner annular clearance between the annular guide body 21 and the cylindrical inner wall 54 of the rotor 14, while rotating the annular guide body 21 in a clockwise direction. When the steering wheel 24 is turned to its clockwise-most position, the flat cable 22 is almost tightly wound on the cylindrical inner wall 54 of the rotor 14.

When now the steering wheel 24 is turned back slightly, that is, turned back in a counterclockwise direction, the flat cable 22 becomes loose and is pressed against the inner wall 71 of the annular guide body 21.

When the steering wheel 24 is further turned in the counterclockwise direction, the flat cable 22 is pushed by the cylindrical inner wall 54 of the rotor 14 while having the outer end thereof pulled from the outside and thus the flat cable 22 is drawn, through the slot 73 of the annular guide body 21, into the outer annular clearance defined around the annular guide body 21. During this, the annular guide body 21 is turned counterclockwise, and the flat cable 22 turns its course by the curled slot 73 of the guide body 21 causing the flat cable 22 drawn into the outer annular clearance to be rounded in a counterclockwise direction from the outside. When the steering wheel 24 is turned to the counterclockwise-most position, the rounded flat cable 22 is almost tightly pressed against the cylindrical outer wall 44 of the stator 15.

If, for checking or the like, it becomes necessary to dismantle the steering wheel 24 from the steering shaft, the steering wheel 24 is turned to its neutral position at first. Then, the handle portion 57*c* of the lock bar 57 of the lock unit 60 is turned at right angles while being pressed downward. With this, the electric connector 10A becomes locked as mentioned hereinabove and the handle portion 57*c* of the lock bar 57 becomes in alignment with the rectangular portion 29*b* of the opening 29 of the boss plate 28. Thus, the steering wheel 24 can be dismantled from the steering shaft without disturbing the arrangement of the connector 10A.

In the following, advantages of the first embodiment will be described.

Due to provision of the lock unit 60, the rotational part, viz., the rotor 14 of the electric connector 10A can be locked at a given angular position. Thus, mounting and dismounting of the connector 10A to and from the steering shaft can be smoothly and readily achieved without worrying about positioning of the rotor 14.

When the steering wheel 24 is properly placed on the steering shaft, a part of the lock unit 60 (viz., the lock bar 57) provided on the connector 10A becomes mated with the opening 29 of the boss plate 28 of the steering wheel 24. Thus, positioning of the steering wheel 24 is facilitated.

Because the flat cable 22 used in the connector 10A is grouped into two flat cable parts which are wound in opposite directions, the entire length of the flat cable 22 can be effectively used.

Due to provision of the annular guide body 21, the flat cable 22 can be smoothly guided in the connector 10A.

Because the annular guide body 21 is formed at both inner and outer cylindrical walls with ridges 78 and 79, the friction between the flat cable 22 and the body 21 is minimized, which induces a smoothed movement of the flat cable 22 in the connector 10A.

Because the slot 73 of the annular guide body 21 is curled, the fore-and-aft movement of the cable 22 through the slot 73 is smoothly made. This also induces a possibility of reducing the size of the annular guide body 21 and thus that of the connector 10A.

Since the ridges 78 and 79 of the annular guide body 21 are so positioned as not to contact portions of the flat cable 22 where the wires are embedded, undesired exposition of the naked wires from the cover, which would occur after long use of the connector 10A, is suppressed.

Due to provision of the two concentric annular grooves 43*a* and 43*b* in the circular base plate 41 of the stator 15, the annular guide body 21 can rotate at a given position in a stable manner, which reduces noises caused by the rotating guide body 21.

As is seen from FIG. 1, the annular space 45 defined between the wall 44 of the stator 15 and the outer wall 31 of the annular housing 16 can serve as a sound insulating space. Thus, emission of noises produced in the connector 10A is effectively suppressed.

In the following, modifications of the first embodiment will be described.

The ridges 78 and 79 of the annular guide body 21 may extend in axial direction or diagonally on the surfaces of the inner and outer cylindrical walls 71 and 72.

The cable passing slot 73 of the annular guide body 21 may be provided with a bridge portion by which the opposed end walls 74 and 75 are integrally connected. With this bride portion, the mechanical strength of the body 21 is much increased.

The coaxial ridge portion 76 of the annular guide body 21 (see FIG. 4) may be provided with a plurality of resilient pieces which, upon assembly, slidably abut against the lower surface of the annular base plate 51 of the rotor 14. With these pieces, play of the annular guide body 21 is more effectively suppressed.

The annular wall 37 of the annular housing 16 may be formed at the inner periphery thereof with a plurality of downward projections which, upon assembly, slidably engage the stepped annular portion 77 of the annular guide body 21. With such projections, the play of the annular guide body 21 is much effectively suppressed.

In place of the flat cable 22, any types of cable may be used in the present invention so long as the above-mentioned advantageous operation is expected therefrom. Furthermore, an optical fiber cable may be also used.

Referring to FIGS. 8 to 11, there is shown a cable type electric connector 10B of a second embodiment of the present invention.

Since the connector 10B of this second embodiment is similar in construction to the connector 10A of the first embodiment, only parts and constructions which are different from those of the first embodiment will be described in the following. The similar parts are denoted by the same numerals as the first embodiment.

Figure 8:
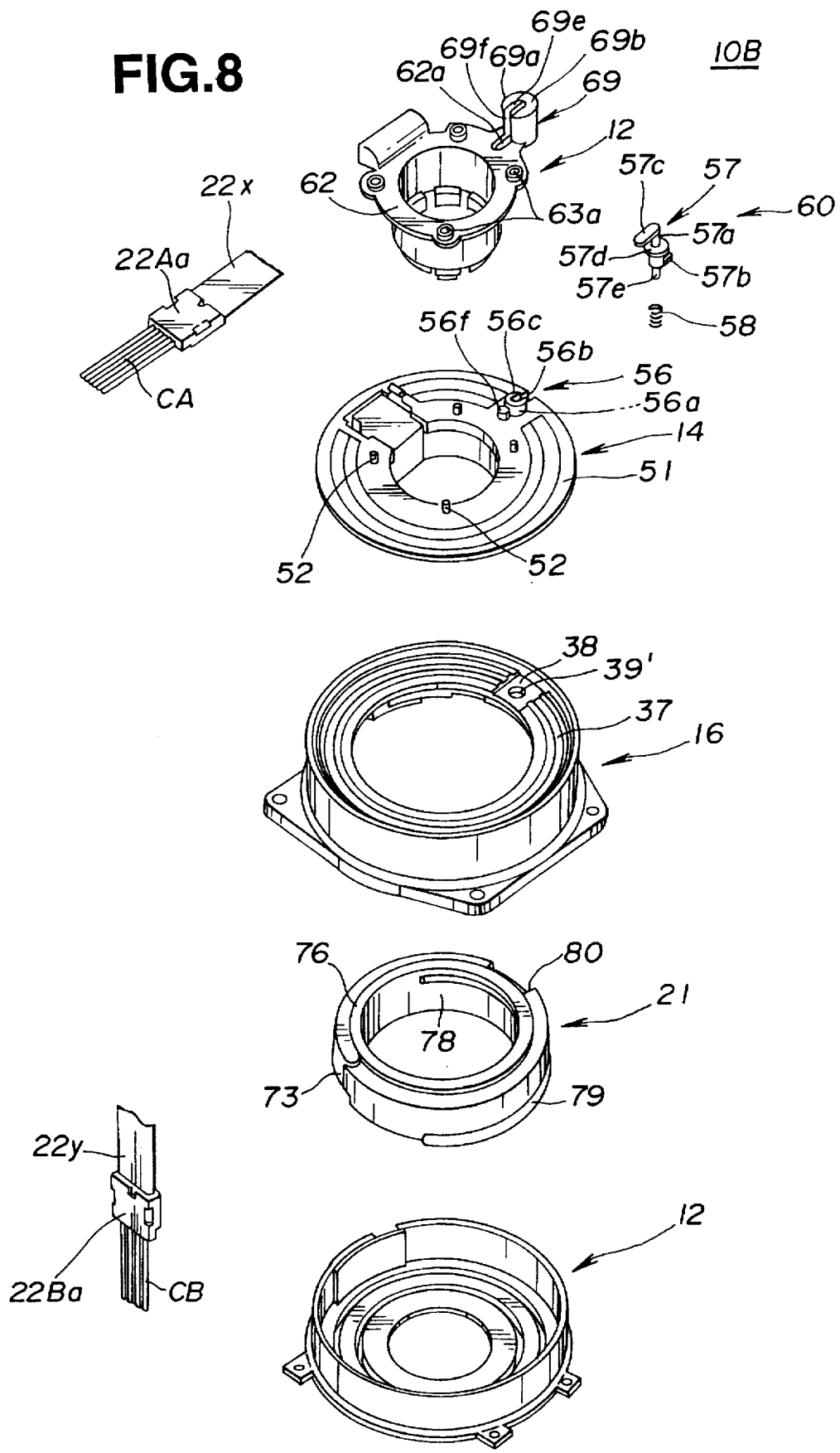
FIG. 8 is an exploded view of a cable type electric connector which is a second embodiment of the present invention.
Figure 9:
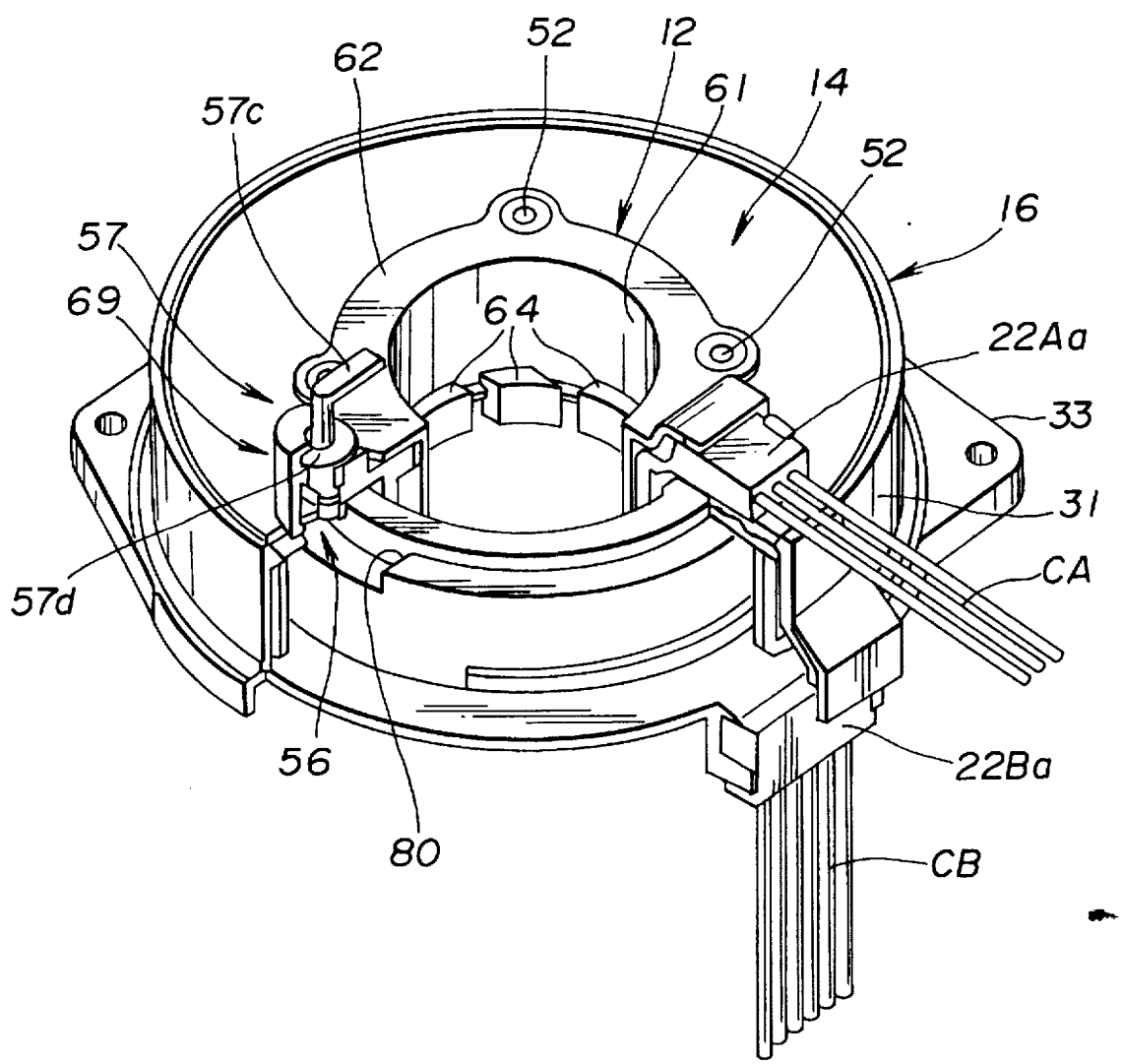
FIG. 9 is a partially cut perspective view of the connector of the second embodiment.

As is seen from FIG. 8, a lock holding structure 56 provided on the rotor 14 has a radially extending slot formed in the base plate 51. The slot comprises a circular part 56a and an elongate part 56b which extends radially from the circular part 56a to the outside of the periphery of the base plate 51. A cylindrical projection 56c having a generally C-shaped cross section projects upward from the periphery of the circular part 56a, as shown. A position pin 56f is formed on the base plate 51 just behind the cylindrical projection 56c.

A lock unit 60 comprises generally a lock bar 57, a coil spring 58 and a cover structure 69. The cover structure 69 is integrally formed on the mounting collar 12, as will be described hereinafter. The lock bar 57 comprises a cylindrical shaft portion 57a, a lock plate portion 57b extending radially from the shaft portion 57a, a handle portion 57c extending from an upper end of the shaft portion 57a in a direction opposite to the lock plate portion 57b, a circular flange portion 57d extending from a middle part of the shaft portion 57a, and an eccentrical lower portion 57e extending downward from the shaft portion 57a.

As is seen from FIG. 8, the mounting collar 12 is formed at its annular flange portion 62 with the cover structure 69. The cover structure 69 comprises a cylindrical portion 69a and a circular lid portion 69b covering an upper open end of the cylindrical portion 69a. The cover structure 69 is formed with a slot which comprises a circular opening 69e formed in the center of the lid portion 69b and an elongate slot 69f which extends from the circular opening 69e to a lower end of the cylindrical portion 69a. The annular flange portion 62 of the mounting collar 12 is formed with an aperture 62a which is merged with the elongate slot 69f.

It is to be noted that in this second embodiment, a circular opening 39' is employed in place of the circular recess 39 of the first embodiment, which is formed in the annular wall 37 of the annular housing 16.

Figure 10:
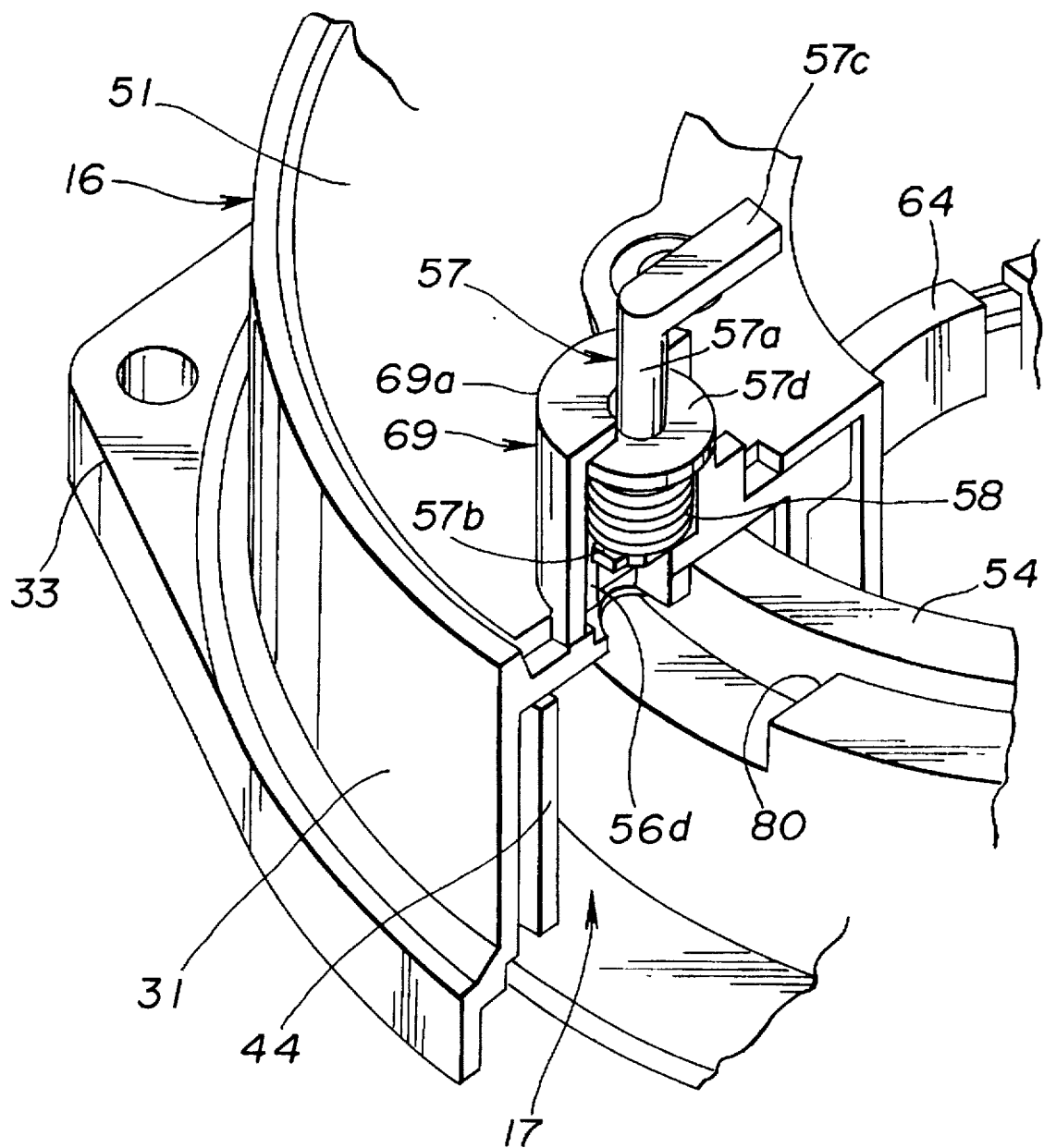
FIG. 10 is a partially cut enlarged perspective view of an essential part of the connector of the second embodiment, showing that a lock bar of a lock mechanism takes its upper inoperative position.
Figure 11:
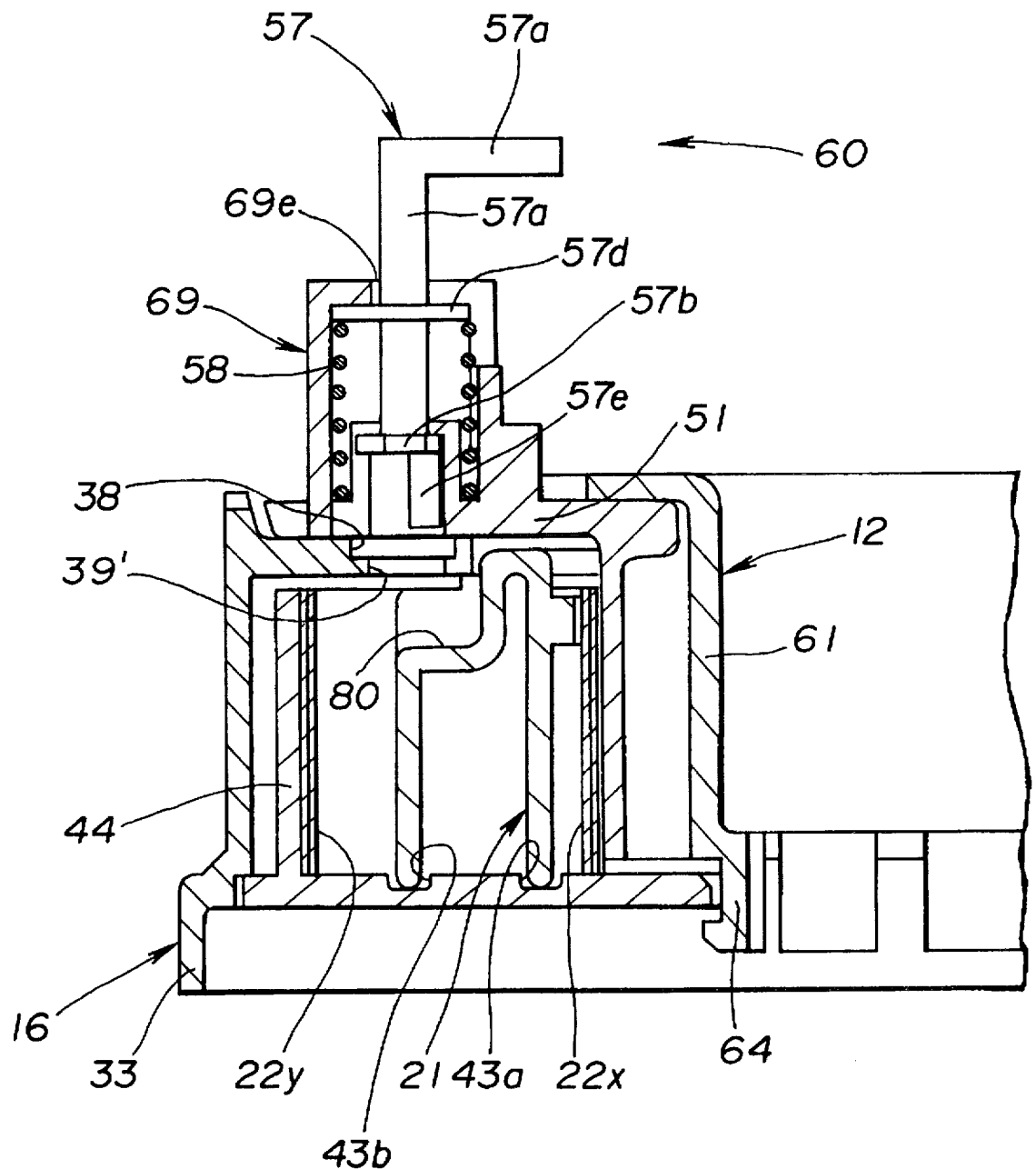
FIG. 11 is a sectional view of the essential part of the connector of the second embodiment, showing that the lock bar takes the upper inoperative position.

As is understood from FIGS. 8, 10 and 11, upon assembly, the cover structure 69 is mated with the cylindrical projection 56c of the lock holding structure 56 while covering the lock bar 57 except the handle portion 57c and the upper part of the shaft portion 57a. As will be understood from FIGS. 8 and 10, the lock bar 57 is held by the lock holding structure 56 in such a manner that shaft portion 57a is rotatably and axially movably held by the circular part 56a of the slot of the holding structure 56. Thus, the circular flange portion 57d is axially movably received between the circular lid portion 69b of the cover structure 69 and the upper surface of the cylindrical projection 56c of the lock holding structure 56. Thus, the lock bar 57 can take an upper inoperative position and a lower operative position.

That is, when the lock bar 57 takes the upper inoperative position wherein as is seen from FIG. 10, the circular flange portion 57d contacts the circular lid portion 69b of the cover structure 69, the lock plate portion 57b is received in a groove 56d formed in the back surface of the base plate 51 of the rotor 14 and at the same time, the eccentrical lower portion 57e is positioned within the cylindrical projection 56c of the rotor 14 above the circular opening 39' of the annular housing 16. While, when the lock bar 57 takes the lower operative position, the lock plate portion 57b is disengaged from the groove 56d and put on the rectangular flat part 38 of the annular housing 16 and at the same time, the eccentrical lower portion 57e is projected downward through the circular opening 39' into the cable receiving annular space 17. Thus, in this lower position, the lock bar 57 can be rotated about its axis.

The coil spring 58 is disposed about the shaft portion 57a of the lock bar 57 and compressed between the circular flange portion 57d of the lock bar 57 and the annular base plate 51 of the rotor 14. Thus, the lock bar 57 is biased upward to take the upper inoperative position.

It is to be noted that in this second embodiment 10B, the annular guide body 21 is formed at an upper outer peripheral portion thereof with an lock recess 80 with which the above-mentioned eccentrical lower portion 57e of the lock bar 57 is engageable.

In order to lock the electric connector 10B of the second embodiment, the following steps are needed.

First, with both the mounting collar 12 and the rotor 14 kept removed from the annular housing 16, the annular guide body 21 in the housing 16 is turned to a given position wherein the lock recess 80 is positioned just below the circular opening 39' of the annular base plate 51 of the housing 16. Then, the rotor 14 is put on the annular base plate 51 in such a manner that the lock unit 60 thereon is positioned just above the circular opening 39' of the housing 16. Then, the mounting collar 12 is fixed to the rotor 14 having the four pins 52 of the rotor 14 received in the openings 63a. Then, the handle portion 57c of the lock bar 57 is pushed down against the force of the coil spring 58 to the lower operative position of the lock bar 57. With this, the lock plate portion 57b is disengaged from the groove 56d and put on the rectangular flat part 38 of the annular wall 37 of the annular housing 16 and at the same time, the eccentrical lower portion 57e is projected through the circular opening 39' into the lock recess 80 of the annular guide body 21 in the cable receiving annular space 17. Then, the handle portion 57c is turned at right angles. With this, the lock plate portion 57b of the lock bar 57 becomes into engagement with an edge wall of the rectangular flat part 38 and at the same time the eccentrical lower portion 57e of the lock bar 57 becomes into engagement with an inner cylindrical wall of the lock recess 80 of the annular guide body 21.

Thus, under this condition, rotation of the annular guide body 21 and that of the rotor 14 relative to the annular housing 16 are suppressed, and thus, the electric connector 10B is locked.

In practice, during the above-mentioned steps, a flat cable 22 is handled with the parts of the electric connector 10B, which may cause difficulty with which the assembly work is carried out. That is, in the locked condition of the connector 10B, the length of the inner flat cable part 22x and that of the outer flat cable part 22f are equal to each other.

For ease of description, the angular position taken by the annular guide body 21 in the locked condition of the connector 10B will be referred to "neutral position" of the guide body 21.

The locked electric connector 10B is then connected to a given position of the motor vehicle in such a manner as has been described hereinabove in the first embodiment.

Since operation of the second embodiment 10B is substantially the same as that of the first embodiment 10A, description of the operation will be omitted.

In the following, modifications of the second embodiment will be described.

If desired, a lock system for locking only two parts, viz., the rotor 14 and the annular guide body 21, may be used. In this case, the lock plate portion 57b of the lock bar 57 and the groove 56d are removed.

Figure 12:
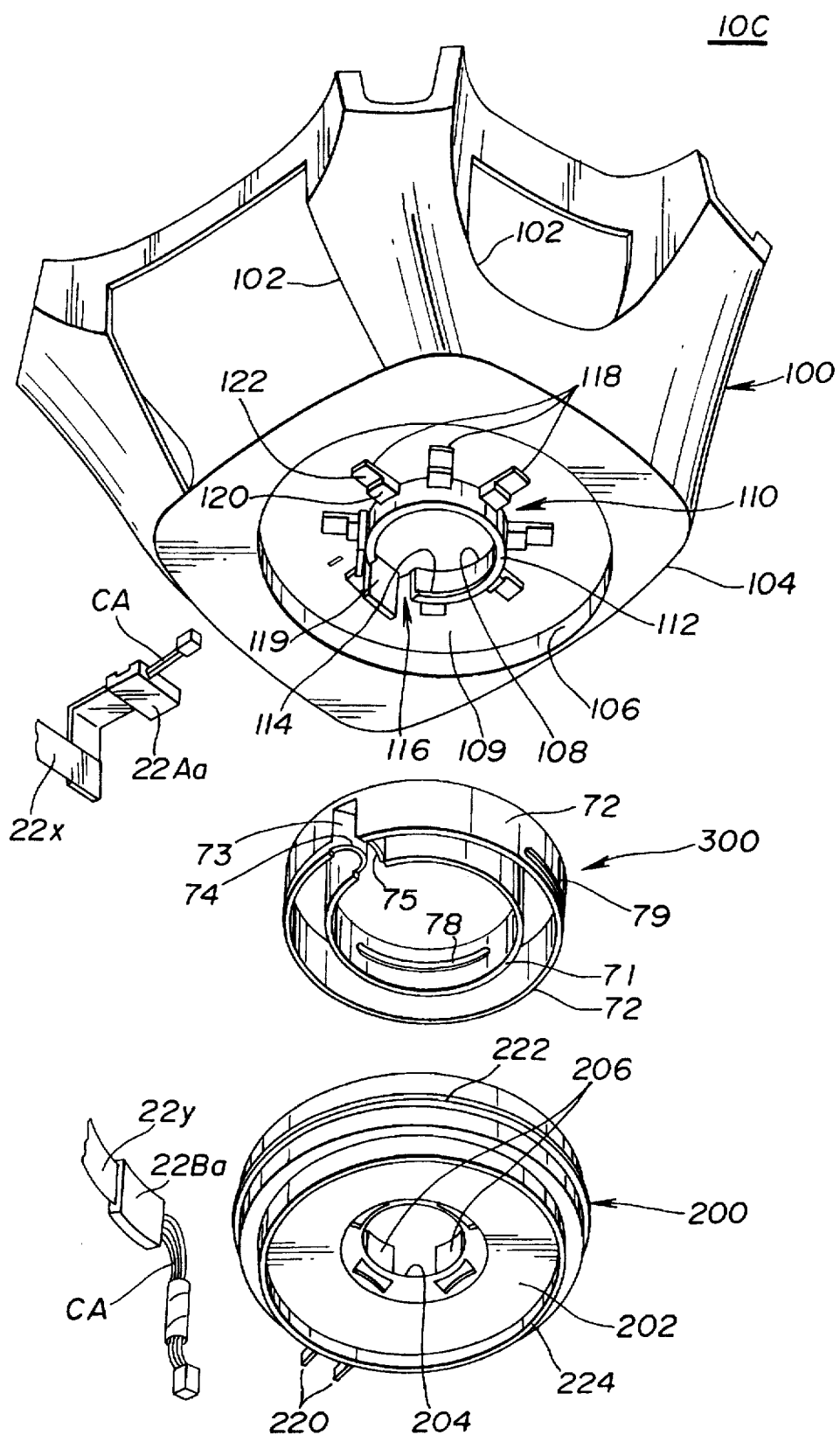
FIG. 12 is an exploded view of a cable type electric connector of a third embodiment of the present invention, with a steering wheel cover which constitutes part of the connector.
Figure 13:
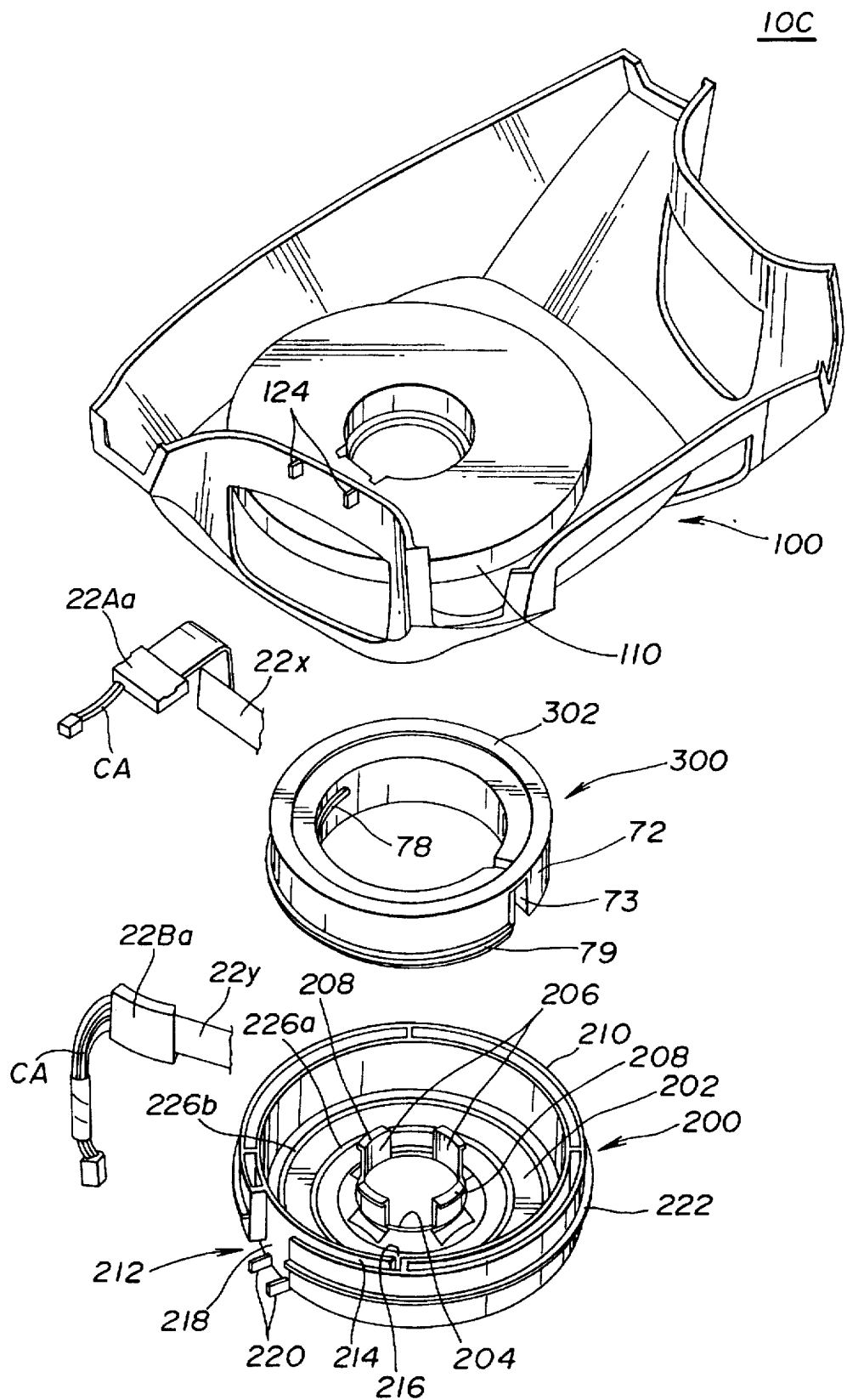
FIG. 13 is an exploded view similar to FIG. 12, but showing the parts turned upside down.
Figure 14:
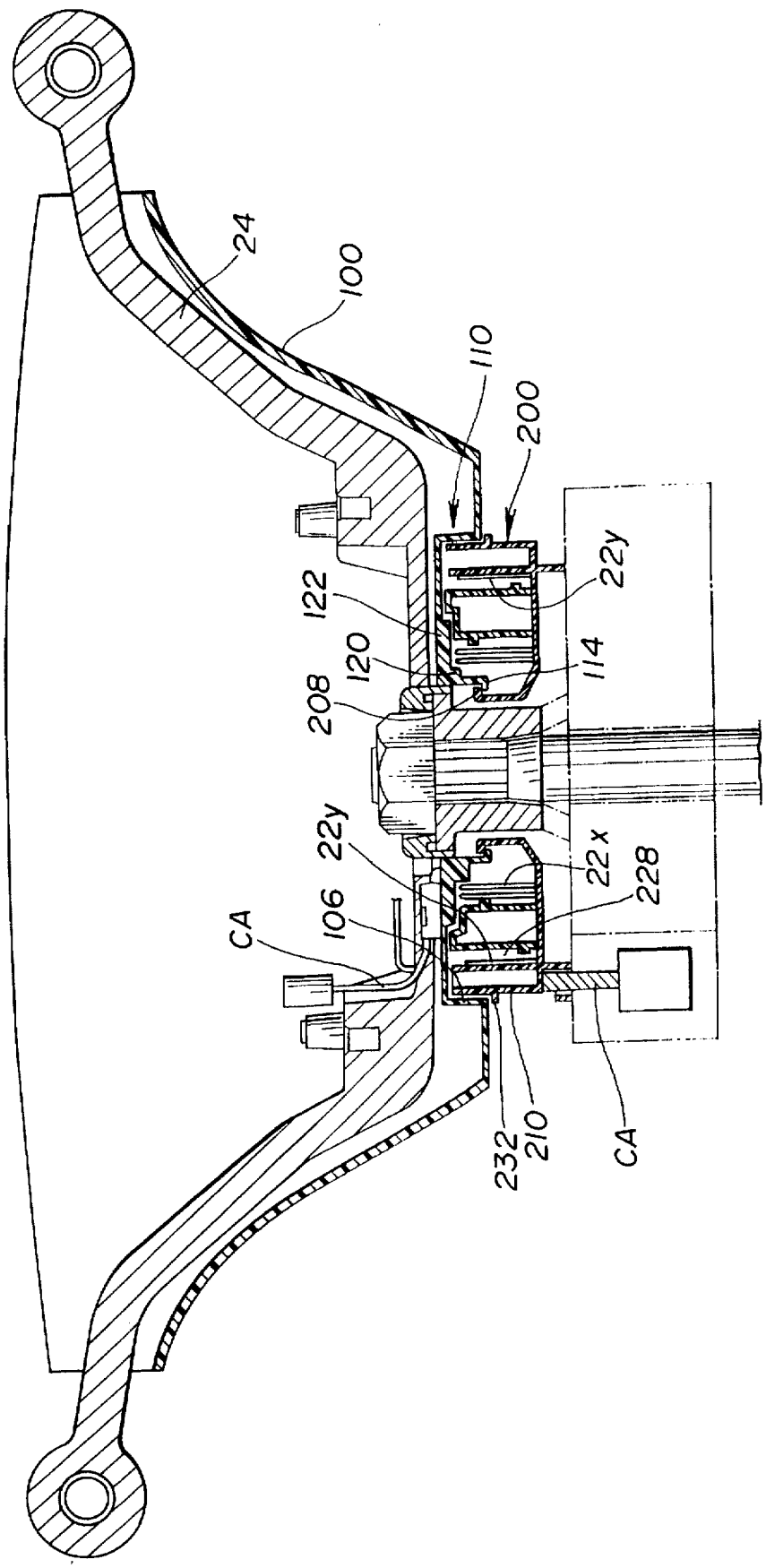
FIG. 14 is a sectional view of the connector of the third embodiment practically mounted to a steering wheel.

Referring to FIGS. 12 to 14, there is shown a cable type electric connector 10C of a third embodiment of the present invention.

As will become apparent as the description proceeds, in the third embodiment, a part of the steering wheel constitutes a rotor which is rotated in an annular housing.

In FIG. 12, designated by numeral 100 is a steering wheel cover which covers a rear side of a steering wheel 24, as is seen from FIG. 14. The cover 100 is constructed of a plastic. For ease of assembling work, apertures 102 are formed in the cover 100. The cover 100 is formed with a hub portion 104 whose center portion is depressed to constitute a circular recess 106. The circular recess 106 is formed at its center portion with a circular opening 108 through which the steering shaft (not shown) passes. Thus, the circular recess 106 has an annular bottom wall 109. Around the circular opening 108, there is formed a rotor 110.

The rotor 110 comprises a cylindrical wall 112 raised, but downward in the drawing, from the periphery of the circular opening 108. As is seen from FIGS. 12 and 14, the cylindrical wall 112 is formed around its leading end with a latching edge 114. The cylindrical wall 112 further has an cable end exposing structure 116 through which an inner end portion of a flat cable 22x is exposed to the outside of the connector 10C. For this exposure, a support lug 119 is formed near the cable end exposing structure 116, which supports an end portion of the flat cable 22x. The cable CA from the socket 22Aa extends upward to the electric parts mounted on the steering wheel. As is seen from FIG. 13, the hub portion 104 is formed, at a back surface thereof near the slot 116, with a pair of cable holding pawls 124 by which the socket 22Aa is held.

Referring back to FIG. 12, a plurality of projections 118 are projected radially outwardly from the cylindrical wall 112, each being mounted on the annular bottom wall 109. Each projection 118 comprises a shallower step 120 and a deeper step 122. As will be described hereinafter, the shallower steps 120 are for supporting the flat cable 22, and the deeper steps 122 are for guiding an annular guide body 300.

Designated by numeral 200 is an annular housing which is mounted at a bottom wall 202 thereof on a fixed portion (such as a steering column) of the vehicle. As will be described hereinafter, the annular housing 200 has an upper part which is coaxially received in the circular recess 106 of the steering wheel cover 100. The bottom wall 202 is formed at a center thereof with a circular opening 204 through which the steering shaft passes.

As is seen from FIG. 13, four latch lugs 206 extend inward from a periphery of the circular opening 204. Each latch lug 206 is formed with a latch pawl 208. That is, when the annular housing 200 is coupled with the rotor 110, the latch pawls 208 are slidably or rotatably engaged with the latching edge 114 of the cylindrical wall 112 of the rotor 110. The annular housing 200 is formed with an outer cylindrical wall 210 of double wall type which includes an outer wall part, an inner wall part and a plurality of ribs which connect the outer and inner wall parts. The outer cylindrical wall 210 is formed with another cable end exposing structure 212 through which an outer end portion of the flat cable 22y is exposed to the outside of the connector 10C. The structure 212 comprises a cable pinching portion 214 defined by the inner and outer wall parts, a slot 216 formed in the inner wall part and a cut portion 218 formed in the outer wall part. The cut portion 218 holds the socket 22Ba of the cable 22y. The cable CA from the socket 22Ba extends to the wire harness connector on the fixed portion of the vehicle. For supporting the socket 22Ba, the cut portion 218 is formed with a pair of cable holing pawls 220. The outer cylindrical wall 210 is formed with an annular flange 222. As is seen from FIG. 12, the annular housing 200 is formed at its bottom portion with a lower flange 224.

Referring back to FIG. 13, the bottom wall 202 of the annular housing 200 is formed with two concentric annular grooves 226a and 226b.

When, as will be seen from FIGS. 12, 13 and 14, the annular housing 200 and the rotor 110 are properly coupled, the latch pawls 208 of the housing 200 are rotatably engaged with the latching edge 114 of the rotor 110.

As is best understood from FIG. 14, the upper portion of the outer cylindrical wall 210 of the annular housing 200 is spacedly received in the circular recess 106 of the rotor 104. The annular flange 222 of the outer cylindrical wall 210 is in slidable contact with a peripheral portion of the circular recess 106 of the rotor 110. Due to this coupling, an annular space 228 is defined between the annular housing 200 and the rotor 110.

Referring back to FIG. 12, designated by numeral 300 is an annular guide body of plastic. This guide body 300 is substantially the same as the annular guide body 21 (see FIG. 4) of the afore-mentioned first embodiment, except a part. Thus, explanation on the same parts will be omitted, and these parts are denoted by the same numerals as in the first embodiment. The different part is that as is seen from FIG. 13, the annular end portion, which faces the rotor 110, is formed at its outer part with a concentric ridge portion 302 which is sized to be mated with the above-mentioned deeper steps 122 of the projections 118 of the rotor 110.

As will be understood from FIGS. 13 and 14, upon assembly, the annular guide body 300 is rotatably put in the annular space 228 in such a manner that the inner and outer cylindrical walls 71 and 72 thereof slidably engage with the respective annular grooves 226a and 226b of the annular housing 200 and the concentric ridge portion 302 thereof is slidably guided by the deeper steps 122 of the projections 118 of the rotor 110. The inner flat cable part 22x is put on the deeper steps 122 of the projections 118.

In the following, steps of assembling the cable type electric connector 10C of the third embodiment will be described with reference to the drawings.

First, as may be understood from FIG. 13, the socket 22Ba of the flat cable 22 is tightly set in the cable end exposing structure 212 of the annular housing 200 leaving the major portion of the cable 22 in the housing 200, and then the flat cable 22 is spiraled in the housing 200 in one direction (that is, in counterclockwise direction in FIG. 13). Then, the flat cable 22 is led into the annular guide body 300 through the slot 73 of the same and spiraled there in the other direction (that is, in clockwise direction in FIG. 13), and the annular guide body 300 is put into the annular housing 200. Then, the inner socket 22Aa of the flat cable 22 is led into the inside of the steering wheel cover 100 through the cable end exposing structure 116 and fixed to the cable holding pawls 124 of the cover 100. Thereafter, the annular housing 200 is coupled with the rotor 110 in the above-mentioned manner.

Then, as is seen from FIG. 14, the cover 100 (viz., assembled connector 10C) is connected to the steering wheel 24 through bolts (not shown). Of course, when the cover 100 is fixed to the steering wheel 24, the annular guide body 300 should take the neutral position.

In the following, advantages of the third embodiment 10C will be described.

Because the rotor 110 of the connector 10C is integrally formed by a part of the steering wheel 24. The number of parts used for the connector 10C is reduced. Furthermore, the procedure of mounting the connector 10C to the vehicle is facilitated.

Because the connector 10C of the third embodiment has no means which corresponds to the mounting collar 12 used in the first and second embodiments 10A and 10B, the diameter of the cylindrical wall 112 of the rotor 110, around which the flat cable 22 is wound, can be reduced by a certain degree. This induces a compact construction of the connector 10C.

Figure 15:
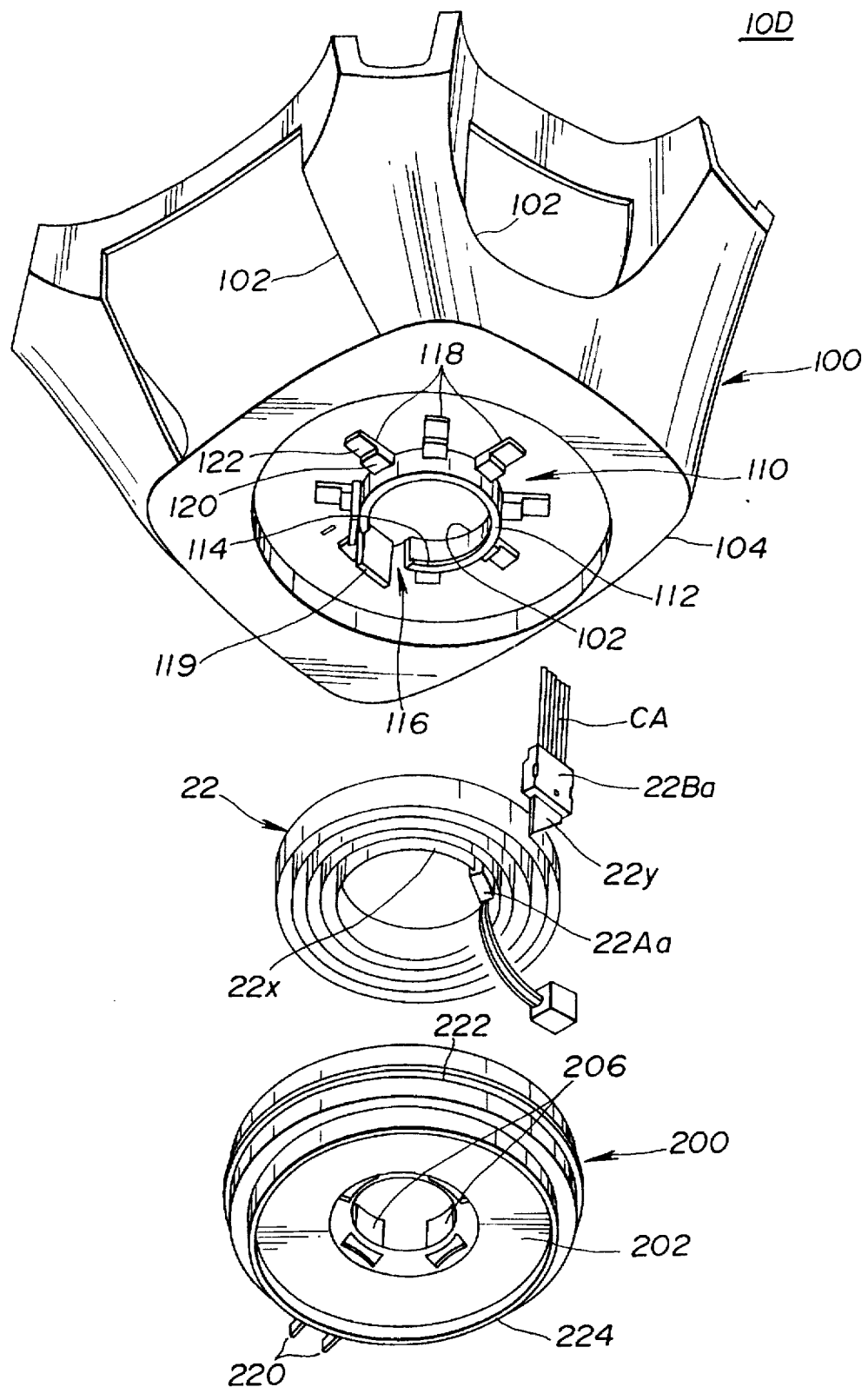
FIG. 15 is an exploded view similar to FIG. 12, but showing a fourth embodiment of the present invention.

Referring to FIG. 15, there is shown a cable type electric connector 10D of a fourth embodiment of the present invention.

In this embodiment, there is no means which corresponds to the annular guide body 21 and 300 which are used in the first, second and third embodiments 10A, 10B and 10C.

That is, the connector 10D of this fourth embodiment is similar to the connector 10C of the above-mentioned third embodiment except the annular guide body. Thus, parts substantially the same as those of the third embodiment 10C are denoted by the same numerals and detailed description of them is omitted from the following.

In this fourth embodiment 10D, the flat cable 22 is put in the annular housing 200 and spiraled in only one direction. The inner socket 22Aa is held by the cable holding pawls (not shown) like in the case of the third embodiment, and the outer socket 22Ba is held by the cable holding pawls 220.

Figure 16:
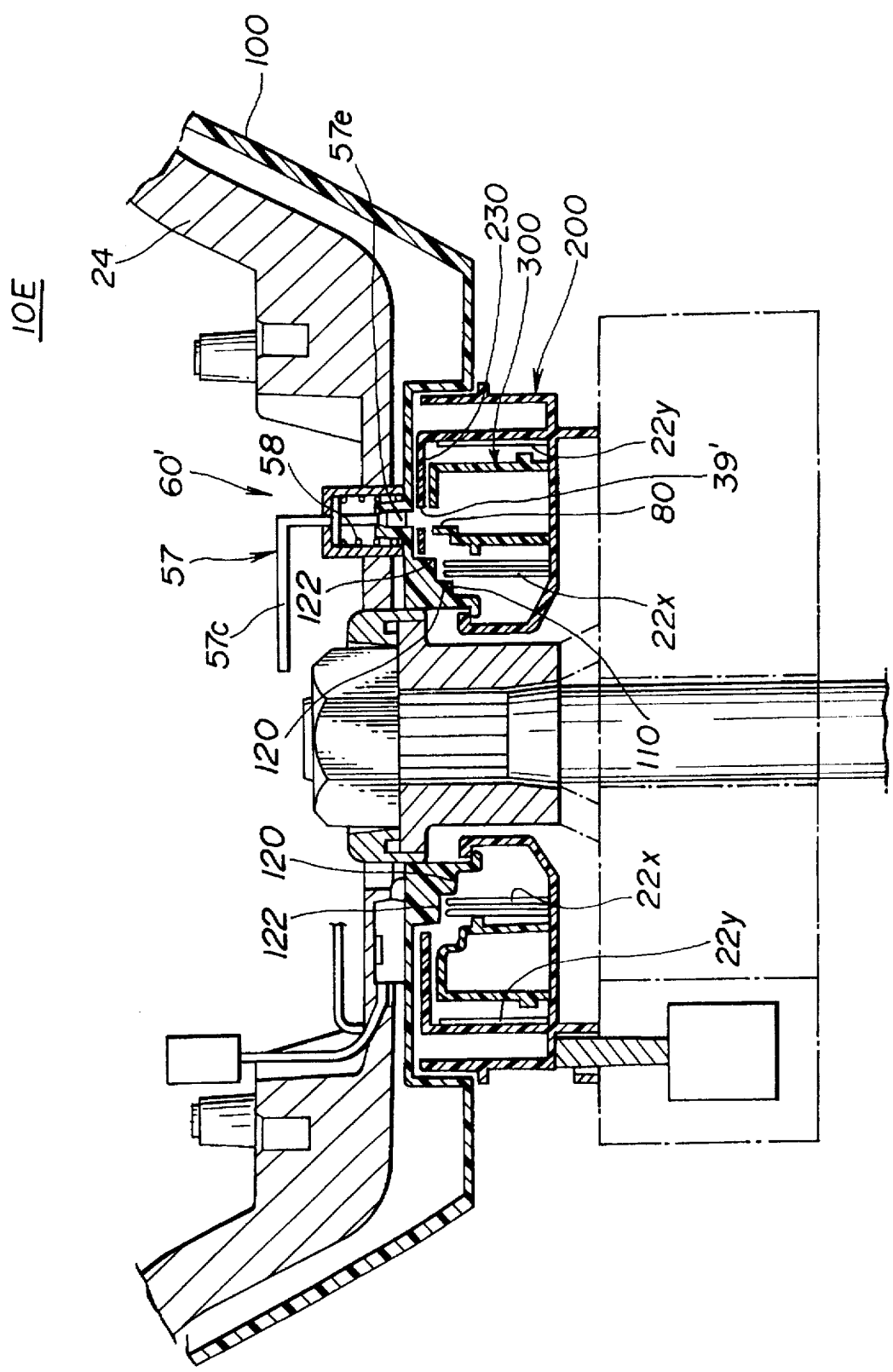
FIG. 16 is a sectional view similar to FIG. 14, but showing a fifth embodiment of the present invention.

Referring to FIG. 16, there is shown cable type electric connector 10E of a fifth embodiment of the present invention.

This fifth embodiment 10E is substantially the same as the above-mentioned third embodiment 10C except that in the fifth embodiment 10E, a lock mechanism is employed and the annular housing 200 has an annular upper wall 230. As is seen from FIG. 16, a lock unit 60' similar to the lock unit 60 of the second embodiment 10B is employed. The annular upper wall 230 is formed with a circular opening 39'.

Figure 17:
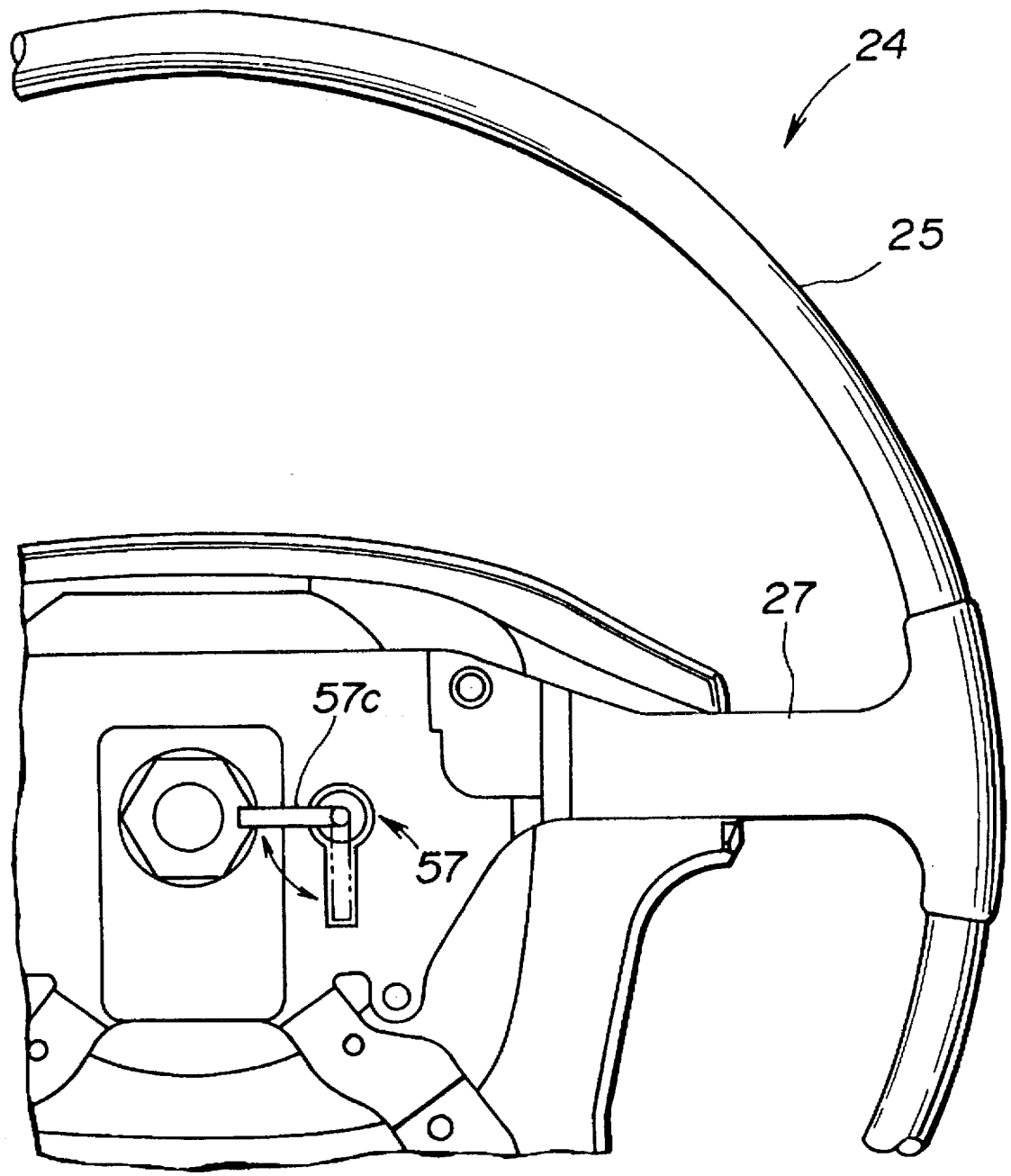
FIG. 17 is a view similar to FIG. 5, but showing the fifth embodiment.

The lock bar 57 is biased upward by a coil spring 58 to take an upper inoperative position. When the handle portion 57c of the lock bar 57 is pushed down against the force of the coil spring 58, the eccentrical lower portion 57e is projected into the lock recess 80 of the annular guide body 300 through the circular opening 39' of the annular upper wall 230. When the handle portion 57c is then turned at right angles as is seen from FIG. 17, the eccentrical lower portion 57e becomes engaged with a wall of the lock recess 80. With this, rotation of the annular guide body 300 and that of the rotor 110 (viz., steering wheel cover 100) relative to the annular housing 200 are suppressed, and thus, the electric connector 10E is locked.

What is claimed is:

1. A cable type electric connector comprising:

an annular housing structure having a first cable leading portion;

an annular guide body rotatably and coaxially received in said annular housing structure, said annular guide body having a cable passing slot;

an annular rotor coaxially disposed on said annular housing structure, said annular rotor having a second cable leading portion;

a flat cable passed through said cable passing slot of said annular guide body so that said flat cable is divided into an inner flat cable part movably received in a circular space surrounded by said annular guide body and an outer flat cable part movably received in an annular space formed around said annular guide body, said inner flat cable part having an inner end exposed to the outside of the connector through said second cable leading portion and said other flat cable part having an outer end exposed to the outside of the connector through said first cable leading portion; and a lock mechanism for preventing rotary movement of at least one of said annular rotor and said annular guide body relative to said annular housing structure, in which said lock mechanism comprises:

a lock bar detachably connected to said annular rotor, said lock bar being axially movable between an inoperative position wherein said lock bar is disengaged from said annular housing structure and an operative position wherein said lock bar is engaged with said annular housing structure;

biasing means for biasing said lock bar in a direction to take said inoperative position; and lock assuring means for assuring the engagement of said lock bar with said annular housing structure when said lock bar in the operative position is turned about a longitudinal axis thereof by a given angle.

2. A cable type electric connector as claimed in claim 1, in which said annular rotor is formed with a lock holding structure for detachably holding said lock bar.

3. A cable type electric connector as claimed in claim 2, in which said lock holding structure comprises:

a radially extending slot formed in said annular rotor, said slot being sized to receive a shaft portion of said lock bar and including a circular part and an elongate part which extends from said circular part to the outside of said annular rotor;

a cylindrical projection of generally C-shaped cross section raised from the periphery of said circular part of said slot.

4. A cable type electric connector as claimed in claim 3, in which said lock mechanism further comprises a cover structure which covers said lock bar and said biasing means except an upper part of said lock bar.

5. A cable type electric connector as claimed in claim 4, in which said upper part of said lock bar is bent at right angles to constitute a handle portion of said lock bar.

6. A cable type electric connector as claimed in claim 1, in which said lock assuring means comprises:
- a rectangular flat recess formed on an annular wall of said annular housing structure, said annular wall slidably supporting thereon said annular rotor;
- a circular opening formed in said rectangular flat recess;
- a lock plate portion formed on said lock bar, said lock plate portion being placed in said rectangular flat recess when said lock bar takes said operative position;
- a lock recess formed on said annular guide body; and
- an eccentrical lower portion of said lock bar, said eccentrical lower portion being projected into said lock recess of said annular guide body through said circular recess when said lock bar is moved from said inoperative position to said operative position, said eccentrical lower portion being brought into engagement with an peripheral edge of said lock recess when said lock bar in said operative position is turned about its axis by the given angle.

7. A cable type electric connector as claimed in claim 6, in which said annular rotor is formed at its back surface with a groove which fully receives therein both said lock plate portion and said eccentric lower portion of the lock bar when said lock bar assumes said inoperative position.

* * * * *